United States Patent
Buys et al.

(10) Patent No.: US 12,541,247 B1
(45) Date of Patent: Feb. 3, 2026

(54) ARTIFICIAL EMOTIONAL INTELLIGENCE USING HUMAN INTERFACE DEVICES (HIDS)

(71) Applicant: Dell Products L.P., Round Rock, TX (US)

(72) Inventors: Trent A. Buys, Seattle, WA (US); Walter Kemp, Georgetown, TX (US); Kai Wang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/885,876

(22) Filed: Sep. 16, 2024

(51) Int. Cl.
G06F 3/01 (2006.01)

(52) U.S. Cl.
CPC ........ *G06F 3/011* (2013.01); *G06F 2203/011* (2013.01)

(58) Field of Classification Search
CPC .......................... G06F 3/011; G06F 2203/011
See application file for complete search history.

(56) References Cited

U.S. PATENT DOCUMENTS

| 2004/0117315 | A1* | 6/2004 | Cornuejols | G06Q 20/389 705/64 |
| 2013/0225261 | A1* | 8/2013 | Cruz-Hernandez | A61B 5/7455 463/23 |
| 2015/0052285 | A1* | 2/2015 | Chiu | G06F 13/4068 710/316 |
| 2019/0058677 | A1* | 2/2019 | Maekawa | H04L 51/212 |
| 2019/0108658 | A1* | 4/2019 | Falkås | G06F 3/04845 |
| 2024/0329747 | A1* | 10/2024 | Dorn | A63F 13/537 |

FOREIGN PATENT DOCUMENTS

CN 106406744 A * 2/2017 ........... G06F 3/0489

* cited by examiner

*Primary Examiner* — Stephen G Sherman
(74) *Attorney, Agent, or Firm* — Fogarty LLP

(57) ABSTRACT

Systems and methods for artificial emotional intelligence using Human Interface Devices (HIDs). In some embodiments, an HID may include a processor; and a memory coupled to the processor, the memory having program instructions stored thereon that, upon execution, cause the processor to: identify a mood of a user based, at least in part, upon sensor data obtained from an HID; and modify an operation based, at least in part, upon the identification.

16 Claims, 10 Drawing Sheets

ARTIFICIAL EMOTIONAL INTELLIGENCE USING HUMAN INTERFACE DEVICES (HIDS)

FIELD

This disclosure relates generally to Information Handling Systems (IHSs), and more specifically, to systems and methods for artificial emotional intelligence using Human Interface Devices (HIDs).

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for artificial emotional intelligence using Human Interface Devices (HIDs) are described. In an illustrative, non-limiting embodiment, an HID may include a processor; and a memory coupled to the processor, the memory having program instructions stored thereon that, upon execution, cause the processor to: identify a mood of a user based, at least in part, upon sensor data obtained from an HID; and modify an operation based, at least in part, upon the identification. The HID may include a keyboard, a mouse, a trackpad, a game controller, a stylus, etc.

The sensor data may be indicative of at least one of: a keystroke frequency, a keystroke velocity, a pressure, a button click frequency, a button click velocity, a mouse pressure, a button pressure, or an after touch. The program instructions, upon execution, cause an OS agent to receive the sensor data over an enhanced data path without any involvement by an Embedded Controller (EC) of the IHS.

The program instruction, upon execution, may cause an Operating System (OS) agent to receive the sensor data over an EC data path. To identify the mood, the program instructions, upon execution, may cause an Artificial Intelligence (AI) model executed by the IHS to process the sensor data.

The mood may include at least one of: focused, frustrated, stressed, excited, curious, distracted, bored, scared, or satisfied. To identify the mood, the program instructions, upon execution, cause an AI model executed by the IHS to process the sensor data.

The AI model may be further configured to process eye tracking data, facial expression data, gesture data, movement data, heart rate data, blood pressure data, or speech data to identify the mood.

To modify the operation, the program instructions, upon execution, may cause the IHS to change an HID light in response to the mood, at least partially disable the HID in response to the mood; adjust a level of difficulty of a game in response to the mood, instruct an application; in response to the mood, to at least temporarily halt sending an email or message; instruct an application, in response to the mood, to at least temporarily halt receiving or displaying an email or message; instruct an application, in response to the mood, to at least temporarily halt a shopping or checkout operation; instruct an application, in response to the mood, to at least temporarily halt an electronic signature operation; etc.

In another illustrative, non-limiting embodiment, a hardware memory device may have program instructions stored thereon that, upon execution by a processor of an HID, cause the HID to: identify a mood of a user based, at least in part, upon sensor data indicative of at least one of: a keystroke frequency, a keystroke velocity, a pressure, a button click frequency, a button click velocity, a mouse pressure, a button pressure, or an after touch; and send an indication of the mood to an IHS.

The program instructions, upon execution, may also cause the HID to send the indication over an enhanced data path without any involvement by an EC of the IHS. The program instructions, upon execution, may cause the HID to send the indication over an EC data path.

In yet another illustrative, non-limiting embodiment, a method may include: identifying a mood of a user based, at least in part, upon sensor data obtained from an HID coupled to an IHS, where the sensor data is indicative of at least one of an input: speed, rhythm, pressure, or error; and at least one of: (a) in response to the mood indicating stress, reducing a level of difficulty of a game or a complexity of a UI; (b) in response to the mood indicating excitement or engagement, maintaining the level of difficulty of the game or the complexity of the UI; or (c) in response to the mood indicating boredom or disengagement, increasing the level of difficulty of a game or the complexity of the UI.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
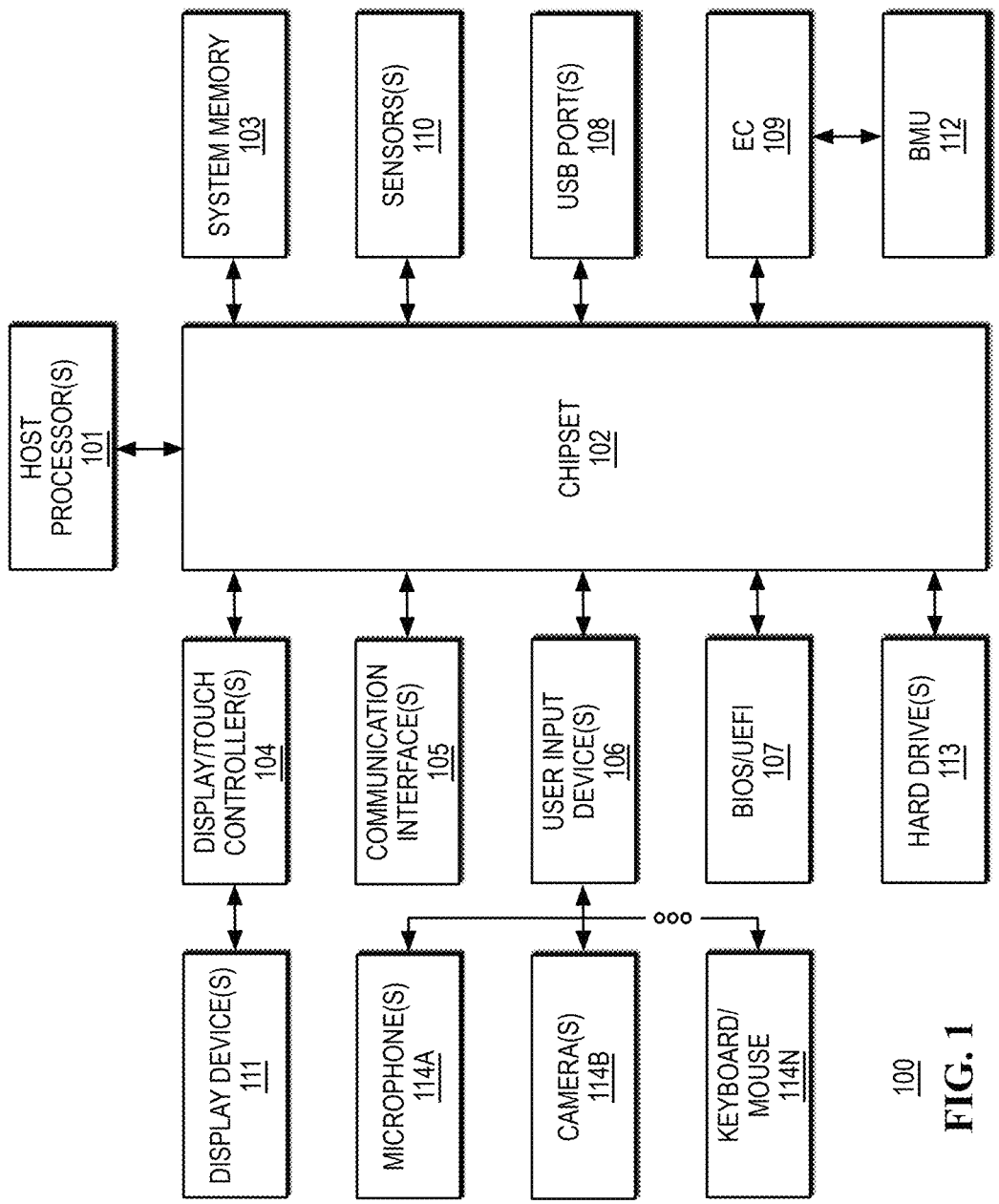
FIG. 1 is a diagram illustrating examples of components of an Information Handling System (IHS), according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various Input/Output (I/O) devices, such as a keyboard, a mouse, touchscreen, and/or a video display. An IHS may also include one or more buses operable to transmit communications between the various hardware components.

The terms "heterogenous computing platform," "heterogenous processor," or "heterogenous platform," as used herein, refer to an Integrated Circuit (IC) or chip (e.g., a System-On-Chip or "SoC," a Field-Programmable Gate Array or "FPGA," an Application-Specific Integrated Circuit or "ASIC," etc.) including a plurality of discrete processing circuits or semiconductor Intellectual Property (IP) cores (collectively referred to as "SoC devices" or simply "devices") in a single electronic or semiconductor package, where each device has different processing capabilities suitable for handling a specific type of computational task. Examples of heterogenous processors include, but are not limited to: QUALCOMM's SNAPDRAGON, SAMSUNG's EXYNOS, APPLE's "A" SERIES, etc., which typically include ARM core(s).

Human Interface Devices (HIDs) are tools that allow users to interact with computers or other electronic systems by converting physical input into digital signals. Most HIDs share several components. Sensors detect user actions, such as key presses or movement, while input mechanisms-like buttons or keys-provide the physical interface for these interactions. Some HIDs incorporate haptic systems, which deliver tactile and/or haptic feedback, simulating physical sensations like clicks or vibrations to improve the user experience. In other HIDs, such as in gaming or performance-oriented devices, lighting systems using LEDs or RGB technology may illuminate key areas for better visibility and aesthetic customization. A microcontroller acts as the processing unit, interpreting sensor data and transmitting it to the computer via a communication interface, such as Universal Serial Bus (USB) or BLUETOOTH (BT). The entire device may be enclosed in a chassis, designed for both protection and ergonomic comfort.

For example, keyboards are a common type of HID. Switches or membranes serve as input mechanisms, with each key press being detected by a sensor and processed by the keyboard's microcontroller, which then sends the signal to an IHS. Some advanced keyboards, particularly those used for gaming, may include optical sensors that detect key presses using light for faster response times. Other keyboards may feature LED or RGB backlighting to improve visibility and provide customizable lighting effects, while others include haptic feedback, simulating the sensation of mechanical key presses in virtual or low-profile models.

The mouse is another example of an HID, utilizing a sensor-typically optical or laser—to track surface movement and relay cursor positioning to the computer. Buttons and a scroll wheel act as the input mechanisms, with tactile feedback provided by micro-switches. The dots per inch (DPI) setting of the mouse's sensor determines its sensitivity, with higher DPI values allowing for finer control over movement. Like keyboards, gaming or high-performance mice may include RGB lighting, illuminating the mouse for both visual appeal and functional feedback. Some mice also include haptic feedback, providing vibration in response to specific actions. Inside the mouse, the microcontroller processes movement and button presses, transmitting the signals to the IHS through either a wired connection or a wireless communication interface.

Other examples of HIDs may include, but are not limited to: trackpads, touchscreens, joysticks, game controllers, graphic tablets, styluses, foot pedals, Virtual Reality (VR) controllers, motion sensors, barcode scanners, smart card readers, biometric devices (such as fingerprint readers), headsets, etc.

Conventionally, an HID may interface with a computer's Embedded Controller (EC) through a communication protocol such as USB or BT. For wired devices, data such as key presses or mouse movements may be transmitted to the EC via the USB connection, where the EC regularly polls the HID for input data. In wireless devices, the HID may communicate via the BT HID profile, transmitting data packets wirelessly. In both cases, the EC processes the incoming signals and forwards them to the OS for appropriate action, such as moving a cursor or registering a keystroke.

Despite advancements in computing power and software capabilities, the interaction between users and HIDs remains largely static, relying on basic input signals like button presses and mouse movements. This limited scope of interaction fails to capture the nuanced ways in which users engage with their devices, thereby restricting the potential for more intuitive and responsive user experiences. Moreover, conventional HIDs do not employ advanced technologies such as Artificial Intelligence (AI) to adapt to user behavior in real-time, thereby limiting their effectiveness in providing a truly intelligent and responsive user interface.

To address these, and other concerns, systems and methods described herein provide intelligent Human Interface Devices (HIDs) that incorporate sensing capabilities and AI-driven functionalities. These intelligent HIDs may be configured to capture a wide range of user interactions, including keystroke frequency, velocity, pressure, and aftertouch, among others. By integrating a processor capable of running AI models, intelligent HIDs may analyze the context of user interactions and adapt their behavior accordingly. This enables a more nuanced and responsive user experience, extending the benefits of AI beyond the application and OS layers to the hardware level. Additionally, the intelligent HIDs may operate with multiple IHSs or independently of any IHS, further enhancing their versatility and usability.

FIG. 1 is a block diagram of examples of components of IHS 100, according to some embodiments. As shown, IHS 100 includes host processor(s) 101. In various embodiments, IHS 100 may be a single-processor system, or a multi-processor system including two or more processors. Host processor(s) 101 may include any processor capable of executing program instructions, such as an INTEL/AMD x86 processor, or any general-purpose or embedded processor implementing any of a variety of Instruction Set Architectures (ISAs), such as a Complex Instruction Set Computer (CISC) ISA, a Reduced Instruction Set Computer (RISC) ISA (e.g., one or more ARM core(s), or the like).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101. Chipset 102 may also be coupled to communication interface(s) 105 to enable communications between IHS 100 and various wired and/or wireless networks, such as ETHERNET, WIFI, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like.

Communication interface(s) 105 may be used to communicate with peripherals devices (e.g., BT speakers, headsets, etc.). Moreover, communication interface(s) 105 may be coupled to chipset 102 via a Peripheral Component Interconnect Express (PCIe) bus, or the like. Chipset 102 may be coupled to display and/or touchscreen controller(s) 104, which may include one or more Graphics Processor Units (GPUs) on a graphics bus, such as an Accelerated Graphics Port (AGP) or PCIe bus. As shown, display controller(s) 104 may provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may operate as a single continuous display, rather than two discrete displays.

Chipset 102 may provide host processor(s) 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a Solid-State Drive (SSD), Non-Volatile Memory Express (NVMe), or the like.

In certain embodiments, chipset 102 may also provide host processor(s) 101 with access to one or more USB ports 108, to which one or more peripheral devices may be coupled (e.g., integrated or external webcams, microphones, speakers, etc.). Chipset 102 may further provide host processor(s) 101 with access to one or more hard disk drives, solid-state drives, optical drives, or other removable media drives 113.

Chipset 102 may also provide access to one or more user input devices 106, for example, using a super I/O controller or the like. Examples of user input devices 106 include, but are not limited to, microphone(s) 114A, camera(s) 114B, and HIDs, such as keyboard/mouse 114N. Other HIDs or user input devices 106 may include a touchpad, stylus or active pen, totem, etc.

Each user input device 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality or "VR/AR" devices, etc.).

In certain embodiments, chipset 102 may further provide an interface for communications with one or more hardware sensors 110. Sensor(s) 110 may be disposed on or within the chassis of IHS 100, or otherwise coupled to IHS 100, and may include, but are not limited to: electric, magnetic, radio, optical (e.g., camera, webcam, etc.), infrared, thermal, force, pressure, acoustic (e.g., microphone), ultrasonic, proximity, position, deformation, bending, direction, movement, velocity, rotation, gyroscope, Inertial Measurement Unit (IMU), accelerometer, etc.

Basic Input/Output System (BIOS)/Unified Extensible Firmware Interface (UEFI) 107 is coupled to chipset 102. In some situations, the terms "BIOS" and "UEFI" may be used interchangeably. In operation, BIOS/UEFI 107 provides an abstraction layer that allows a host OS to interface with certain hardware components utilized by IHS 100.

When IHS 100 is powered on, host processor(s) 101 may utilize program instructions of BIOS/UEFI 107 to initialize and test hardware components coupled to IHS 100, and to load host OS 312 for use by IHS 100. As used herein, the term "pre-boot" refers to the period of time, processes, and/or environment between the initialization of host processor(s) 101 and its taking over by host OS 312, after host OS 312 is loaded and operational.

Through a hardware abstraction layer provided by BIOS/UEFI 107, software stored in system memory 103 and executed by host processor(s) 101 may interface with certain I/O devices that are coupled to IHS 100.

EC 109 (sometimes referred to as a Baseboard Management Controller or "BMC") includes a microcontroller unit or processing core dedicated to handling selected IHS operations not ordinarily handled by host processor(s) 101. Examples of such operations may include, but are not limited to: power sequencing, power management, receiving and processing signals from a keyboard or touchpad, as well as operating chassis buttons and/or switches (e.g., power button, laptop lid switch, etc.), receiving and processing thermal measurements (e.g., performing cooling fan control, CPU and GPU throttling, and emergency shutdown), controlling indicator Light-Emitting Diodes or "LEDs" (e.g., caps lock, scroll lock, num lock, battery, ac, power, wireless LAN, sleep, etc.), managing a battery charger and a battery, enabling remote management, diagnostic tests (or "diagnostics"), remediation over an OOB or sideband network, etc.

Unlike other devices in IHS 100, EC 109 may be operational from the time IHS 100 is first powered on, before other devices are fully running or even powered. As such, EC 109 firmware may be responsible for interfacing with a power adapter to manage the various power states that may be supported by IHS 100. Power operations of the EC 109 may also provide other components of the IHS 100 with power status information for the IHS, such as whether IHS 100 is operating from battery power or is plugged into an AC power source. Firmware instructions utilized by EC 109 may be used to manage other core operations of IHS 100 (e.g., turbo modes, maximum operating clock frequencies of certain components, etc.).

From the perspective of users, IHS 100 may appear to be either "on" or "off," without any other detectable power states. In some embodiments, however, an IHS 100 may support multiple power states that may correspond to the states defined in the Advanced Configuration and Power Interface (ACPI) specification, such as: S0, S1, S2, S3, S4, S5, and G3.

EC 109 may implement operations for detecting certain changes to the physical configuration or posture of IHS 100 (such as a laptop computer). For instance, when IHS 100 as a 2-in-1 laptop/tablet form factor, EC 109 may receive inputs from a lid position or hinge angle sensor 110, and may use those inputs to determine: whether the two sides of IHS 100 have been latched together to a closed position or a tablet position, the magnitude of a hinge or lid angle, etc. In response to these changes, EC 109 may enable or disable certain features of IHS 100 (e.g., front or rear facing camera, etc.).

In this manner, EC 109 may identify any number of IHS physical postures, including, but not limited to: laptop, stand, tablet, or book. For example, when an integrated display 111 of IHS 100 is open with respect to a horizontal, face-up position of an integrated keyboard, EC 109 may determine IHS 100 to be in a laptop posture. When an integrated display 111 of IHS 100 is open with respect to a horizontal keyboard portion, but the keyboard is facing down (e.g., its keys are against the top surface of a table), EC 109 may determine IHS 100 to be in a kickstand posture. When the back of an integrated display 111 is closed against the back of the keyboard portion of an IHS, EC 109 may determine IHS 100 to be folded in a tablet posture. When IHS 100 has two integrated displays 111 that are open side-by-side (e.g., in a hybrid laptop with displays in both panels), EC 109 may determine an IHS 100 to be in a book posture. When an IHS 100 is determined to be in a book posture, EC 109 may also determine if the display(s) 111 of IHS 100 are arranged in a landscape or portrait orientation, relative to the user.

In some implementations, EC 109 may be installed as part of a Trusted Execution Environment (TEE) component to the motherboard of IHS 100. As a component with hardware root-of-trust (ROT), EC 109 may be further configured to calculate hashes or signatures that uniquely identify individual components of IHS 100. In such scenarios, EC 109 may calculate a hash value based upon the configuration of a hardware and/or software component coupled to IHS 100. For instance, EC 109 may calculate a hash value based upon all firmware and other code or settings stored in an onboard memory of a hardware component.

Hash values may be calculated as part of a trusted process of manufacturing IHS 100 and may be maintained in secure storage as a reference signature. EC 109 may later recalculate a hash value based upon instructions and settings loaded for use by a hardware component of IHS 100 and may compare the calculated value against the reference hash value to determine if any modifications have been made to the component, thus indicating that the component has been compromised. As such, EC 109 may verify the integrity of hardware and software components installed in IHS 100.

In some embodiments, EC 109 may provide an OOB (Out-Of-Band) or sideband channel that allows an Information Technology Decision Maker (ITDM) or Original Equipment Manufacturer (OEM) to manage various settings and configurations of an IHS 100. OOB is used in contradistinction with "in-band" communication channels that operate only after networking 105 other interfaces of the IHS have been initialized, and the OS of the IHS has been successfully booted.

In various embodiments, IHS 100 may be coupled to an external power source through an AC adapter, power brick, or the like. The AC adapter may be removably coupled to a battery charge controller to provide IHS 100 with a source of DC power provided by battery cells of a battery system in the form of a battery pack (e.g., a lithium ion or "Li-ion" battery pack, or a nickel metal hydride or "NiMH" battery pack including one or more rechargeable batteries). Battery Management Unit (BMU) 112 may be coupled to EC 109 and it may include, for example, an Analog Front End (AFE), storage (e.g., non-volatile memory), and a microcontroller. In some cases, BMU 112 may be configured to collect and store information, and to provide that information to EC 109.

Examples of information collectible by BMU 112 may include, but are not limited to: operating conditions (e.g., battery operating conditions including battery state information such as battery current amplitude and/or current direction, battery voltage, battery charge cycles, battery state of charge, battery state of health, temperature, battery usage data such as charging and discharging data; and/or IHS operating conditions such as processor operating speed data, system power management and cooling system settings, state of "system present" pin signal), environmental or context information (e.g., such as ambient temperature, relative humidity, system geolocation measured by GPS or triangulation, time and date, etc.), etc.

In various embodiments, EC 109 may be coupled (e.g., via a GPIO pin) to any of a plurality of IHS components including, but not limited to: a fan, a cable, a battery, a temperature sensor, or a display. Moreover, EC 109 may be configured to perform or trigger the performance of any number of diagnostic operations for any of these components. For example, in some cases EC 109 may be configured to request that display 111 perform a Built-In-Self-Test (BIST) and to return BIST results to EC 109 upon completion. In other cases, however, EC 109 may itself run the diagnostic operation.

In some embodiments, IHS 100 may not include all components shown in FIG. 1. In other embodiments, IHS 100 may include other components in addition to those shown in FIG. 1. Furthermore, some components illustrated as separate components in FIG. 1 may instead be integrated with other components, such that all or a portion of the operations executed by the illustrated components may instead be executed by the integrated component.

For instance, in various embodiments, host processor(s) 101 and/or other components shown in FIG. 1 (e.g., chipset 102, display controller(s) 104, communication interface(s) 105, EC 109, etc.) may be replaced by devices within a heterogenous computing platform. As such, IHS 100 may assume different form factors including, but not limited to: servers, workstations, desktops, laptops, appliances, video game consoles, tablets, smartphones, etc.

Historically, IHSs with desktop and laptop form factors have had conventional host OSs executed on INTEL or AMD's "x86"-type processors. Other types of processors, such as ARM processors, have been used in smartphones and tablet devices, which typically run thinner, simpler, and/or mobile OSs (e.g., ANDROID, iOS, WINDOWS MOBILE, etc.). More recently, however, IHS manufacturers have started producing fully-fledged desktop and laptop IHSs equipped with ARM-based, heterogeneous computing platforms. Accordingly, host OSs (e.g., WINDOWS on ARM) have been developed to provide users with a familiar OS experience on those platforms.

Figure 2:
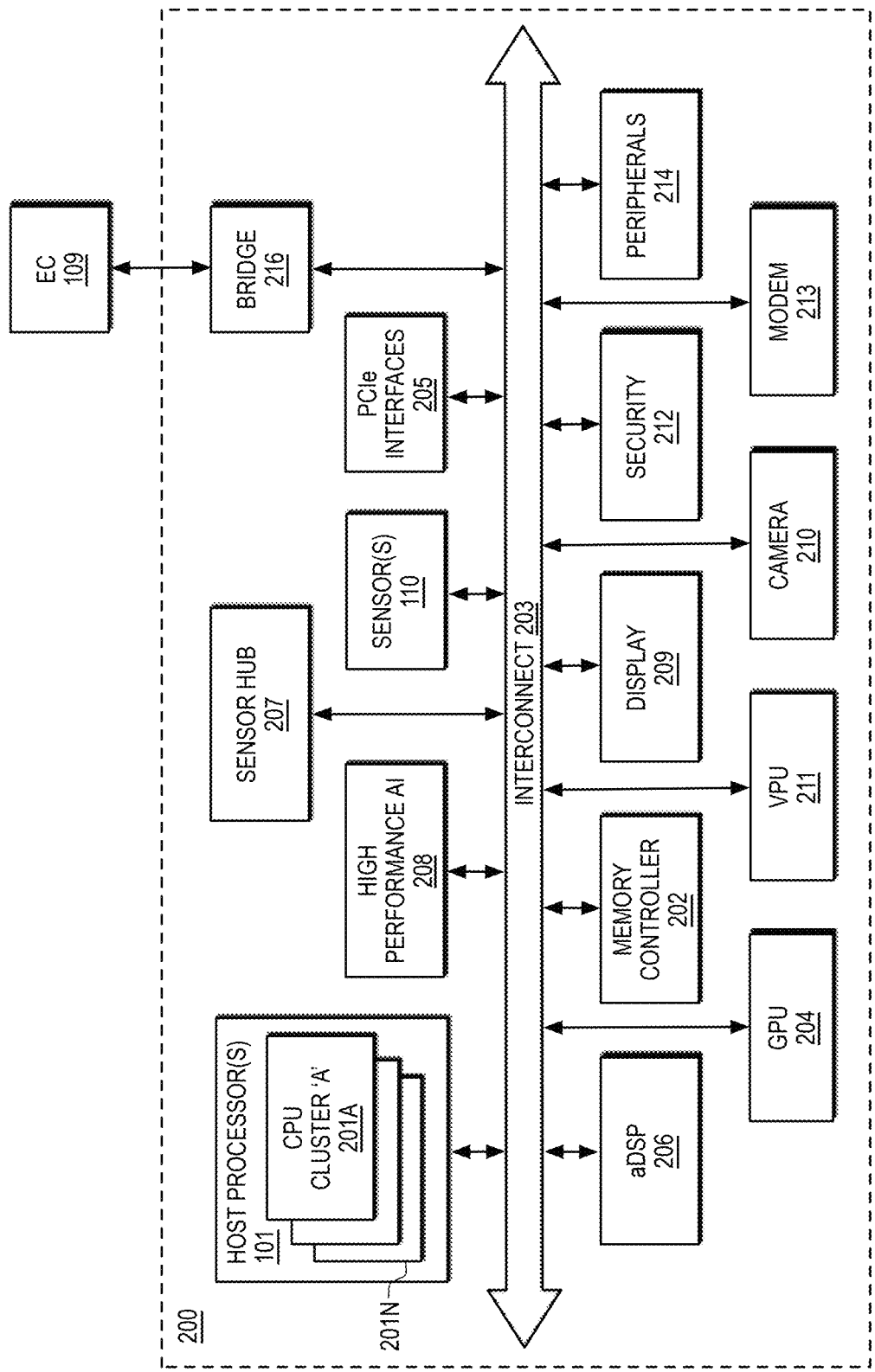
FIG. 2 is a diagram illustrating an example of a heterogenous computing platform, according to some embodiments.

FIG. 2 is a diagram illustrating an example of heterogenous computing platform 200 which may be implemented as part of IHS 100 and/or it may replace certain components shown in FIG. 1 (e.g., host processor(s) 101)). In various embodiments, heterogenous computing platform 200 may be implemented as one or more SoCs, FPGAS, ASICs, or the like.

Heterogenous computing platform 200 may include one or more discrete and/or segregated devices or components, each having a different set of processing capabilities suitable for handling a particular type of computational task. When each device in platform 200 is tasked with executing only the types of computational tasks that it is specifically designed to execute, the overall power consumption of heterogenous computing platform 200 is reduced.

In various implementations, some of the devices in heterogenous computing platform 200 may include their own microcontroller(s) or core(s) (e.g., ARM core(s)) and corresponding firmware. In some cases, a device in platform 200 may also include its own hardware-embedded accelerator (e.g., a secondary or co-processing core coupled to a main core). Each device in heterogenous computing platform 200 may be accessible through a respective Application Programming Interface (API). Additionally, or alternatively, some devices in heterogenous computing platform 200 may execute their own OS. Additionally, or alternatively, one or more of the devices of heterogenous computing platform 200 may be virtual devices.

In the embodiment illustrated in FIG. 2, heterogenous computing platform 200 includes CPU clusters 201A-N that may correspond to system processor(s) 101, and that are intended to perform general-purpose computing operations. Each of CPU clusters 201A-N may include one or more processing cores and cache memories. In operation, CPU clusters 201A-N are available and accessible to the IHS's host OS 312 (e.g., WINDOWS on ARM) and other applications executed by IHS 100.

CPU clusters 201A-N may be coupled to memory controller 202 via internal interconnect fabric 203. Memory controller 202 may be responsible for managing system memory access for all of devices connected to internal interconnect fabric 203, which may include any communication bus suitable for inter-device communications within an SoC (e.g., Advanced Microcontroller Bus Architecture or "AMBA," QuickPath Interconnect or "QPI," HyperTransport or "HT," etc.).

Devices coupled to internal interconnect fabric 203 may communicate with each other and with a host OS executed by CPU clusters 201A-N. In some cases, devices 209-211 may be coupled to internal interconnect fabric 203 via a secondary interconnect fabric (not shown). A secondary interconnect fabric may include any bus suitable for inter-device and/or inter-bus communications within an SoC.

GPU 204 produces graphical or visual content and communicates that content to a monitor or display of IHS 100 for rendering. In some embodiments, display engine or controller 209 may be designed to perform additional video enhancement operations. In operation, display engine 209 may implement procedures for providing the output of GPU 204 as a video signal to one or more external displays coupled to IHS 100 (e.g., display device(s) 111). PCIe interfaces 205 provide an entry point into any additional devices external to heterogenous computing platform 200 that have a respective PCIe interface (e.g., graphics cards, USB controllers, etc.).

Audio Digital Signal Processor (aDSP) 206 is a device designed to perform audio and speech operations and to perform in-line enhancements for audio input(s) and output(s). Examples of audio and speech operations include, but are not limited to: noise reduction, echo cancellation, directional audio detection, wake word detection, muting and volume controls, filters and effects, etc. In operation, input and/or output audio streams may pass through and be processed by aDSP 206, which can send the processed audio to other devices on internal interconnect fabric 203 (e.g., CPU clusters 201A-N).

In some embodiments, aDSP 206 may be configured to process one or more of heterogenous computing platform 200's sensor signals (e.g., gyroscope, accelerometer, pressure, temperature, etc.), low-power vision or camera streams (e.g., for user presence detection, onlooker detection, etc.), or battery data (e.g., to calculate a charge or discharge rate, current charge level, etc.).

Camera device 210 includes an Image Signal Processor (ISP) configured to receive and process video frames captured by a camera coupled to heterogenous computing platform 200 (e.g., in the visible and/or infrared spectrum). Video Processing Unit (VPU) 211 is a device designed to perform hardware video encoding and decoding operations, thus accelerating the operation of camera 210 and display/graphics device 209. VPU 211 may be configured to provide optimized communications with camera device 210 for performance improvements.

Sensor hub 207 may include AI capabilities designed to consolidate information received from other devices in heterogenous computing platform 200, process context and/or telemetry data streams, and provide that information to: (i) a host OS, (ii) other applications, and/or (iii) other devices in platform 200. In collecting data, sensor hub 207 may include General-Purpose Input/Output (GPIOs) that provide Inter-Integrated Circuit ($I^2C$), Improved $I^2C$ ($I^3C$), Serial Peripheral Interface (SPI), Enhanced SPI (eSPI), and/or serial interfaces to receive data from sensors (e.g., sensors 110, camera 210, peripherals 214, etc.). Sensor hub 207 may include a low-power core configured to execute small neural networks and specific applications, such as contextual awareness and other enhancements.

High-performance AI device 208 is a significantly more powerful processing device than sensor hub 207, and it may be designed to execute multiple complex AI algorithms and models concurrently (e.g., Natural Language Processing, speech recognition, speech-to-text transcription, video processing, gesture recognition, user engagement determinations, etc.). For example, high-performance AI device 208 may include a Neural Processing Unit (NPU), Tensor Processing Unit (TPU), Neural Network Processor (NNP), or Intelligence Processing Unit (IPU), and it may be designed specifically for AI and Machine Learning (ML), which speeds up the processing of AI/ML tasks while also freeing processor(s) 101 to perform other tasks. Using such capabilities, one or more devices of heterogenous computing platform 200 (e.g., GPU 204, aDSP 206, sensor hub 207, high-performance AI device 208, VPU 211, etc.) may be configured to execute one or more AI model(s), simulation(s), and/or inference(s).

Security device 212 may include one or more specialized security components, such as a dedicated security processor, a Trusted Platform Module (TPM), a TRUSTZONE device, a PLUTON processor, or the like. In various implementations, security device 212 may be used to perform cryptography operations (e.g., generation of key pairs, verification of digital certificates, etc.) and/or it may serve as a hardware RoT for heterogenous computing platform 200 and/or IHS 100.

Modem/wireless controller 213 may be designed to enable wired and wireless communications in any suitable frequency band (e.g., BLUETOOTH or "BT," WiFi, CDMA, 5G, satellite, etc.), subject to AI-powered optimizations/customizations for improved speeds, reliability, and/or coverage.

Peripherals 214 may include any device coupled to heterogenous computing platform 200 (e.g., sensors 110) through mechanisms other than PCIe interfaces 205. In some cases, peripherals 214 may include interfaces to integrated devices (e.g., built-in microphones, speakers, and/or cameras), wired devices (e.g., external microphones, speakers, and/or cameras, Head-Mounted Devices/Displays or "HMDs," printers, displays, etc.), and/or wireless devices (e.g., wireless audio headsets, etc.) coupled to IHS 100.

In some implementations, EC 109 may be integrated into heterogenous computing platform 200 of IHS 100. In other implementations EC 109 may be external to the heterogenous computing platform 200 (i.e., the EC 109 residing in its own semiconductor package) but coupled to integrated bridge 216 via an interface (e.g., enhanced SPI or "eSPI"), thus supporting the EC's ability to access the SoC's interconnect fabric 203, including sensor hub 207 and sensor(s) 110. Through this connectivity supported by interconnect fabric 203, EC 109 may directly access and/or operate most or all of devices 201-216, 110 of heterogenous computing platform 200.

Figure 3:
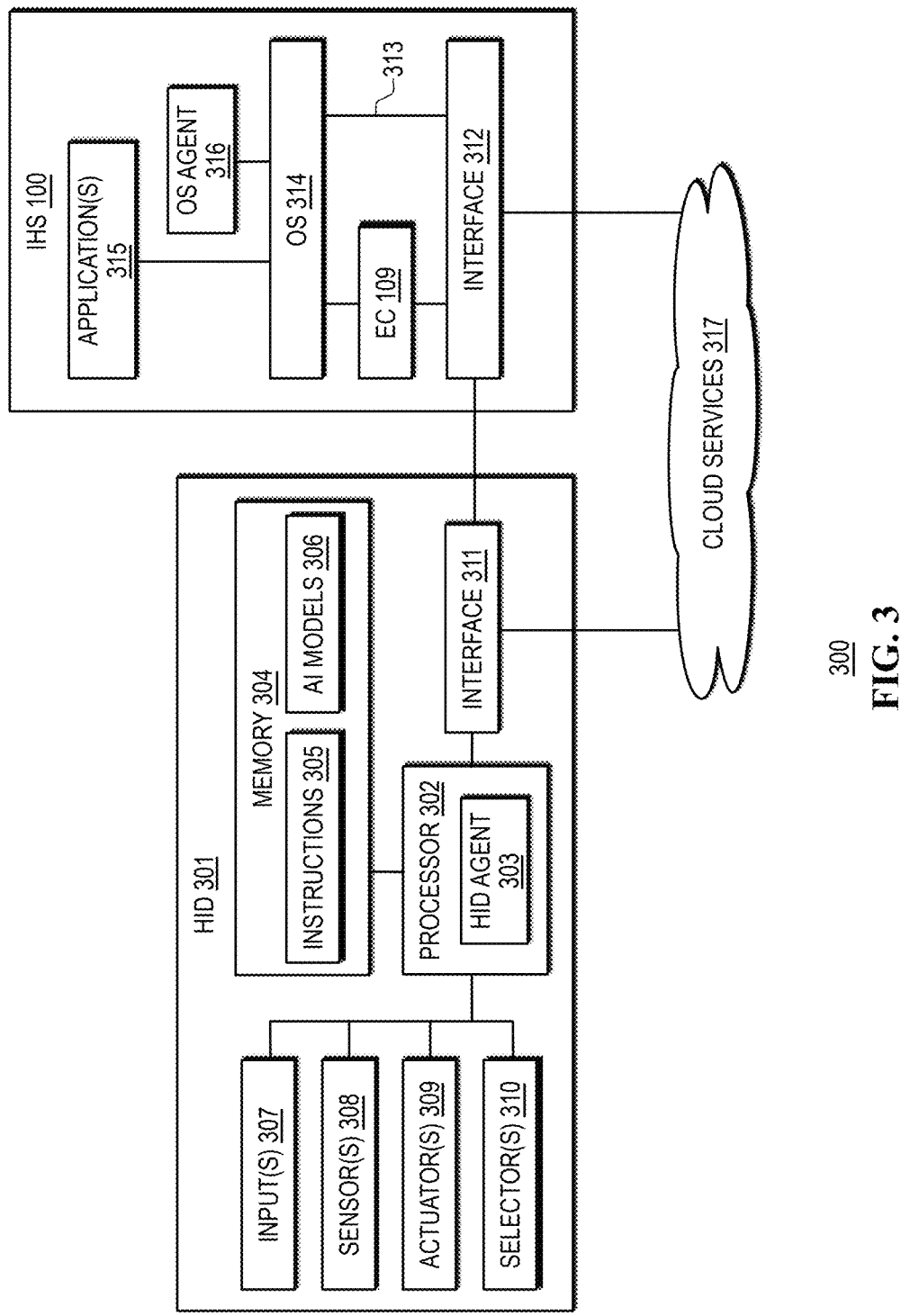
FIG. 3 is a diagram illustrating an example of an intelligent Human Interface Device (HID) architecture, according to some embodiments.

FIG. 3 is a diagram illustrating an example of an intelligent HID architecture 300. Particularly, intelligent HID architecture 300 includes 100, an intelligent HID 301, and cloud services 317. IHS 100 comprises interface 312, EC 109, OS 314, applications(s) 315, OS agent 316, and Enhanced Data Path (EDP) 313. HID 301 comprises hardware memory 304, program instructions 305, AI models 306, processor 302, HID agent 303, interface 311, input(s) 307, sensor(s) 308, actuator(s) 309, and selector(s) 310.

HID 301 may include memory 304, which stores instructions 305 and AI models 306. Instructions 305, when executed by processor 302, enable the HID 301 to perform various operations. AI models 306 may be used by processor 302 to analyze user interactions and adapt the behavior of the HID 301 accordingly. Processor 302 executes instructions 305 and AI models 306 to process data received from sensor(s) 308 and inputs(S) 307. HID agent 303, EC 109, and/or OS agent 314 facilitate communication between HID 301 and IHS 100 within the HID architecture 300.

Sensors 308 in the HID 301 detect various user interactions, such as keystroke frequency, velocity, pressure, and aftertouch, among others. When HID is a keyboard, for example, each key may be equipped with one or more sensors to capture various aspects of user interactions. For example, a frequency sensor may measure the time interval between individual keystrokes or button presses. This data may be used to determine the rate at which a user is typing or clicking. For example, if a user types 80 characters per minute, the frequency sensor may capture this information and provide it to the processor for further analysis. This metric may be be used to infer the user's typing speed and consistency, which may be valuable for applications like user mood inference or biometric profiling.

A velocity sensor may measure the speed at which a key is pressed or released. This may involve capturing the time it takes for a key to travel from its initial position to its fully depressed state and back. For instance, a user may press a key quickly or slowly, and this speed may vary based on the user's intent or emotional state. The velocity data may be processed by the HID's processor to provide insights into the user's interaction style, which may be used for adaptive responses or security measures. A pressure sensor may measure the amount of force applied by the user when a key is fully pressed. This sensor may capture the intensity of the key press, which can vary from a light touch to a hard press. In the context of an intelligent HID, pressure data may be used to determine the user's intent or emotional state, and/or to provide appropriate feedback or actions based on detected pressure levels.

An aftertouch sensor may measure the continued pressure applied to a key after it has been fully pressed. This sensor may capture the variations in pressure that occur while the key remains depressed. For example, in a gaming scenario, aftertouch may be used to control the intensity of an action, such as the speed of a character's movement or the force of a weapon's strike. Aftertouch data may be processed by the HID's processor to provide a more nuanced and expressive user interaction, enhancing the overall user experience.

In an intelligent HID, these sensors work in tandem to provide a comprehensive understanding of the user's interactions. The frequency, velocity, pressure, and aftertouch data are collected by the sensors and transmitted to the HID's processor. The processor may run AI models on this data to determine the context of the user's actions and adapt the HID's behavior accordingly.

Input(s) 307 represents a physical device and/or interface for capturing user interactions, such as buttons, keys, or movement. Actuator(s) or driver(s) 309 may deliver tactile and/or haptic feedback, enhancing the user experience. Selectors 310 may allow the user to choose different AI models or settings for HID 301.

Interface 311 may enable HID agent 303 to communicate with EC 109 and/or OS agent 316 (via EDP 313). Interfaces 311 and/or 312 may also enable HID 301 and IHS 100 to communicate with each other and/or with cloud services 317. These interfaces may be implemented using various technologies and protocols, including USB, BT, Wi-Fi, proprietary communication protocols, PCIe, Thunderbolt, Ethernet, NFC, etc. In some cases, these interfaces may allow HID 301 to offload selected processing tasks to the cloud, enhancing the capabilities and performance of HID 301. For example, cloud services 317 may provide additional processing power and storage for the HID architecture 300.

IHS 100 may include application(s) 315, which are software programs that perform specific tasks for the user of IHS 100. OS 314 and OS agent 316 may facilitate communication between application(s) 315 and other components of the IHS 100, as well as HID 301.

In some cases, EDP 313 may provide a high-speed communication channel between HID 301 and IHS 100. EDP 313 may be implemented using various technologies and protocols, including USB, BT, Wi-Fi, proprietary communication protocols, PCIe, Thunderbolt, etc. By providing a high-speed communication channel, EDP 313 ensures efficient and reliable data transmission between HID 301 and IHS 100, enabling a more responsive and adaptive user experience.

HID agent 303 is a software component instantiated based on the execution of instructions 305 stored in memory 304. Moreover, HID agent 303 acts as an intermediary between the HID's hardware components, such as sensors 308 and actuators, and IHS 100. HID Agent 303 may facilitate communications between HID 301 and IHS 100, ensuring that data collected by the HID's sensors is transmitted to the IHS for further processing. Additionally, or alternatively, HID agent 303 may manage the execution of AI models 306 stored in memory 304, enabling real-time analysis of user interactions. It may also be configured to coordinate with other components, such as EC 109 and/or OS agent 316.

OS agent 316 is a software component executed by OS 314 of IHS 100 that acts as a bridge between OS 314, applications 315, and HID 301. OS agent 316 may facilitate communication between these components, so that data from HID 301 may be processed and utilized by IHS 100. OS agent 316 may also be configured to manage EDP 313 to provide a high-speed communication channel between the HID and the IHS, enabling efficient and reliable data transmission. To enable seamless integration and operation within HID architecture 300, OS agent 316 may receive commands from applications 315 and OS 314, and control aspects of HID 301 based on these commands, such as providing haptic feedback or lighting effects, loading new AI models in HID 301, selecting AI models for execution by HID 301 (e.g., based on contextual information), etc.

In sum, HID agent 303, EC 109, and OS agent 316 may work together to facilitate communication, manage power and thermal operations, execute AI models, and ensure efficient and adaptive operation of intelligent HID architecture 300.

Meanwhile, HID 301 may store a variety of AI models 306 designed to analyze user interactions and adapt the behavior of HID 301 accordingly. These models may be tailored for various applications, enhancing the user experience by providing more intuitive and responsive interactions.

For example, a Keystroke Dynamics AI model may analyze the typing patterns of a user, including keystroke frequency, velocity, pressure, and/or after touch. By learning the unique typing characteristics of an individual, the model may be used for biometric authentication, detecting anomalies, and providing personalized feedback. For instance, the AI model may identify if an unauthorized user is attempting to use the HID based on deviations from a registered typing pattern or signature.

K-Nearest Neighbors (K-NN) is a machine learning algorithm that may classify a user's typing behavior based on features such as keystroke frequency, velocity, pressure, and aftertouch. The process may begin with data collection from sensors 308, followed by feature extraction to create a feature vector representing the user's typing behavior. During a training phase, labeled data from authorized users may be collected and stored in a database. When a new typing session starts, HID 301 may extract the feature vector for the current session and use the K-NN algorithm to classify the user's typing behavior. Processor 302 may calculate the distance between the current feature vector and those in the training set, identify the K nearest neighbors, and perform majority voting to determine the class label, which represents the user's identity or profile Based on the classified identity or profile, HID 301 and/or IHS 100 may make decisions regarding the operation of HID 301 and/or IHS 100. For example, if a classified user is recognized as an authorized user, HID 301 may allow access to HID 301 and/or IHS 100. If the user is not recognized, HID 301 may restrict access or trigger additional security measures. This approach may enable HID 301 to provide biometric authentication and adaptive responses, enhancing security and user experience by leveraging the unique typing characteristics (e.g., cadence, etc.) of each user.

Ordinarily, HIDs do not have the context of their interactions and therefore allow the user to have a full range of keystrokes, mouse events, etc. This may lead to incorrect interactions such as typos, copy/paste errors, and input into incorrect fields. To address this issue, an AI model may be created to determine the type of input needed and limit the active keys to those required for the current input. For example, if a user is inputting into a field for numeric input, HID 301 may disable all letter keys and any punctuation not related to math. As another example, during a video game, restricting function keys may be useful.

If the AI model determines that numeric input is most likely, then on HID 301 that do not include a full number pad, the "function" number pad on the alpha keyboard may automatically become active, and the remaining alpha keys may be disabled. The AI model may learn and/or use system context to determine the type of input needed and restrict the active keys accordingly.

For instance, a Context-Aware Input AI model such as described above may use contextual information from OS 314 and/or applications 315 to adapt the HID's behavior. If the user is working on a spreadsheet, the model may enable a numeric keypad and disable unnecessary keys. If the user switches to a text editor, the model may re-enable the full keyboard layout and provide text-specific suggestions. This approach ensures that the HID adapts dynamically to the user's current task, enhancing both efficiency and accuracy.

An Auto-Correct and Text Prediction AI model may use Natural Language Processing (NLP) techniques to predict and correct text as the user types. It may suggest word completions, correct spelling errors, and/or provide grammar suggestions in real-time. The model may be trained on specific writing styles, such as legal or technical writing, to offer more contextually relevant suggestions.

For example, if the Auto-Correct and Text Prediction AI model detects an error in the keystrokes, HID 301 may add, remove, or replace characters to make the text grammatically and spelling correct. This may include simple spelling errors, capitalization, insertion of punctuation, and/or other grammatical errors. In some cases, the Auto-Correct and Text Prediction AI model may remember the user's most frequently misspelled or mistyped words and train the data so that it can apply AI interaction at the hardware/HID layer.

This feature may be particularly beneficial for non-native language users, as it helps correct the most frequently misspelled or mistyped words, improving their typing accuracy and efficiency. HID 301 may store the telemetry (trained data) so that it may apply the solution when connected to different IHSs and/or OSs, thus eliminating the need to retrain the data when transferring to new systems.

An example of a Language Translation and Localization AI model may translate text input from one language to another in real-time. It may also adapt the HID 301 (e.g., keyboard) layout and character set based on the user's language preferences. For instance, if a user is typing in English but needs to send an email in French, the model may automatically translate the text and adjust the keyboard to include French diacritical marks.

The Language Translation and Localization AI model may be configured to assist the user by translating words, locale data, and diacritical marks for input into the appropriate terms for the intended audience. The AI model may determine that the content being created is intended for consumption by a user who speaks a different language and either translate the content into the receiving user's language or change the character set to match the user's localized character set. Similarly, the AI model may be responsible for changing measurements into the appropriate units based upon the localization of the receiving user. For example, if an US English speaker were to send an email to someone who is a French speaker in Paris, then the AI model may convert any measurements from Imperial to Metric units and insert appropriate characters such as è or a, as needed. The AI model may also include automatic translation into the receiver's preferred language.

A Gesture Recognition AI model may recognize and interpret gestures made on a touchpad or touchscreen. It may be used to perform various actions, such as zooming, scrolling, and navigating through applications. The model may learn and adapt to the user's preferred gestures, providing a more personalized and efficient interaction experience.

An example of a Biometric Profiling AI model may create a biometric profile of the user based on their interaction patterns with the HID. It may include data from keystroke dynamics, mouse movements, pressure, and aftertouch sensors. The profile may be used for continuous authentication, ensuring that only the authorized user can access HID 301 and/or IHS 100. The model may also adapt to changes in the user's behavior over time, maintaining accuracy and security.

An Adaptive Learning AI model may continuously learn from the user's interactions and adapt the HID's behavior accordingly. It may identify patterns and preferences, such as frequently used shortcuts or preferred typing speed, and adjust the HID's settings to optimize the user experience. The model may also provide personalized recommendations and tips based on the user's behavior.

An example of a Health and Ergonomics AI model may monitor the user's interaction patterns to provide insights and recommendations for improving ergonomics and reducing strain. For example, it may detect prolonged periods of typing or mouse use and suggest breaks or ergonomic adjustments. The model may also provide feedback on typing posture and hand positioning to promote healthier interaction habits.

A User Mood Inference AI model may use data from various sensors, such as keystroke dynamics, mouse movements, pressure, and after touch sensors, to infer an emotional state of the user. For instance, rapid and forceful keystrokes may indicate frustration or stress. The model may then trigger appropriate actions, such as suggesting a break or preventing the sending of an emotionally charged email.

An example of an Adaptive Gaming Control AI model may be configured for gaming applications, where it may analyze the user's input patterns and adapt the controls accordingly. For example, it may adjust the sensitivity of the mouse or keyboard based on the user's playing style, provide real-time feedback, and/or automate repetitive actions to enhance the gaming experience.

As such, AI models 306 in intelligent HID 301 may be tailored for various applications, including biometric authentication, user mood inference, auto-correct and text prediction, adaptive gaming controls, language translation, context-aware input, gesture recognition, biometric profiling, adaptive learning, health and ergonomics, and more. These models enhance the user experience by providing more intuitive, responsive, and personalized interactions with the HID.

By integrating these AI capabilities directly into HID 301, systems and methods described herein may provide more granular and immediate control over input events, enhancing the overall security and user experience. Moreover, AI-enhanced HID 301 may operate independently of a main computing device, thanks to wireless networking capabilities, further enhancing its versatility and usability.

In various embodiments, AI models 306 may be optimized to fit within the constraints of the HID's hardware while still providing effective functionality. In various implementations, reducing the size of these models may be important for ensuring that they can run efficiently on HID 301. To reduce the size of these models, techniques include, but are not limited to: model pruning, quantization, knowledge distillation, model compression, efficient neural network architectures, edge AI frameworks, task-specific AI models, model partitioning, etc.

As such, intelligent HID architecture 300 may support AI initiatives by allowing parameters to be mapped as label inputs to trigger specific feature outputs in a supervised learning algorithm or to contribute as fine-tuning parameters for Large Language Models (LLMs).

In various embodiments, cloud services 317 may store AI models and provide them to HID 301 and/or IHS 100, for example, upon their request or based on an AI model distribution policy. This may allow for more complex and resource-intensive models to be utilized without overburdening the local hardware of the HID or IHS. In some cases, by offloading the storage and/or management of AI models to the cloud, architecture 300 may dynamically load and update models based on the current requirements and user interactions.

In addition to storing AI models, cloud services 317 may also provide additional processing power and storage for the HID environment. For example, complex computations and data analysis tasks may be offloaded to the cloud, freeing up local resources and ensuring faster response times. Cloud services 317 may also facilitate real-time data synchronization and backup, ensuring that user profiles, preferences, and interaction data are consistently updated and securely stored. Furthermore, cloud services 317 can enable seamless integration with other cloud-based applications and services.

Figure 4:
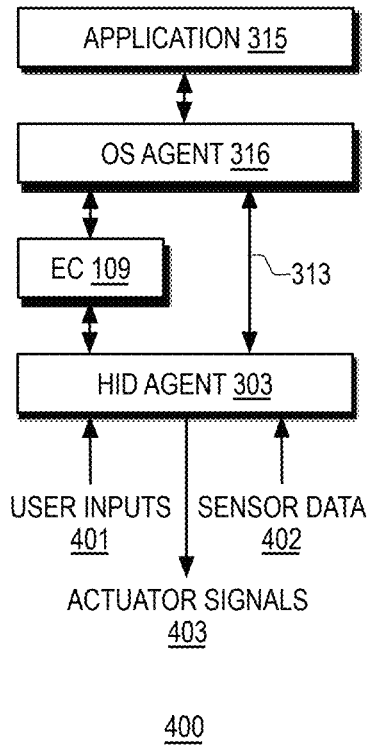
FIG. 4 is a diagram illustrating an example of an intelligent HID communication system, according to some embodiments.

FIG. 4 is a diagram illustrating an example of an intelligent HID 301 communication system 400 to show how various components within architecture 300 work together to process user inputs 401, sensor data 402, and actuator signals 403. Particularly system 400 includes application 315, OS agent 316, EC 109, EDP 313, HID agent 303, user inputs 401, sensor data 402, and actuator signals 403.

Applications 315 may include any software program running on IHS 100 to perform specific tasks for the user. These applications may interact with OS Agent 316. OS agent 316 may also enable certain types of communications between OS 314, applications 315, and HID 301 (e.g., sensor data, inference data, context information, AI models, commands, etc.).

EC 109 also processes certain types of signals from the HID and other input devices (e.g., keystrokes, button clicks, movement, etc.). EDP 313 provides a high-speed communication channel between HID 301 and IHS 100, enabling efficient and reliable data transmission.

HID agent 303 may be configured to communicate between HID 301 and IHS 100, manage the execution of AI models 306 stored in memory 305, and coordinate with other components such as EC 109 and OS agent 316 to ensure facilitate the operation of system 400.

As shown, user inputs 401 represent the physical interactions of the user with the HID, such as keystrokes, mouse movements, and button presses. These inputs may be captured by the HID's sensors 308 and processed by HID agent 303. Sensor data 402 may include raw user input and/or various metrics such as keystroke frequency, velocity, pressure, and aftertouch. Actuator signals 403 control the operation of actuators within HID 301 to provide tactile feedback to the user, such as vibrations or haptic responses. In some cases, a lighting signal may be provided in addition or as an alternative to actuator signal 403 to control LEDs, lighting effects, etc. of HID 301.

Figure 5:
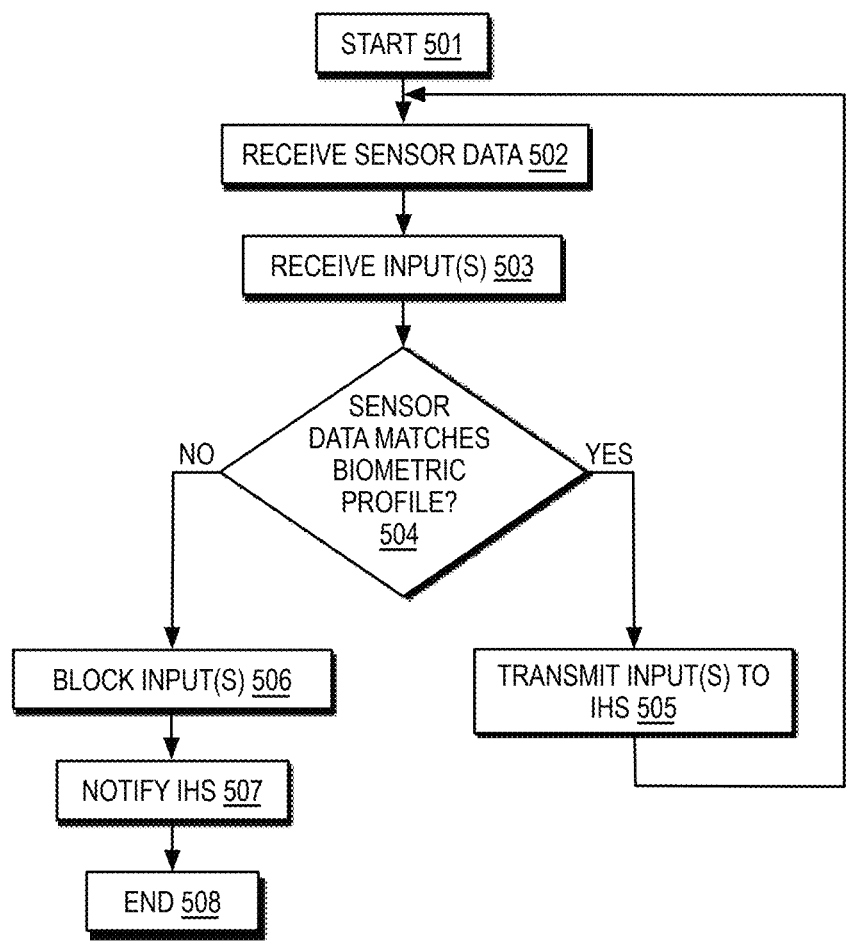
FIG. 5 is a diagram illustrating an example of a method for authenticating a user of an intelligent HID using a biometric profile, according to some embodiments.

FIG. 5 is a diagram illustrating an example of method 500 for authenticating a user of intelligent HID 301 using a biometric profile. In various embodiments, method 500 may be implemented, at least in part, by HID agent 303, EC 109, and/or OS agent 316. Particularly, method 500 starts at 501.

At 502, method 500 includes receiving sensor data 402 from HID 301. Sensor data 402 may include various metrics such as keystroke frequency, velocity, pressure, and aftertouch, which are captured by sensors 308 integrated into HID 301.

At 503, method 500 includes receiving raw user input(s) 401 from the user. Inputs 401 may include keystrokes, mouse movements, button presses, or other interactions with HID 301.

At 504, method 500 may determine whether sensor data 402 and/or processed sensor data (e.g., through operation of a Keystroke Dynamics AI model among models 306) matches a stored biometric profile for one or more authorized users of HID 301 and/or IHS 100. The biometric profile may include an indication of the unique interaction patterns of an authorized user, including, for example, their typing speed, pressure, aftertouch, and other characteristics. Such operation may include comparing current sensor data with one or more stored biometric profiles to verify a user's identity.

At 505, if sensor data 402 and/or processed sensor data matches the biometric profile, method 500 may transmit raw user input(s) 401 and/or processed user input(s) (e.g., through operation of any of AI models 306) to IHS 100, thus allowing the authorized user's inputs to be processed and acted upon by IHS 100.

Conversely, at 506, if sensor data 402 and/or processed sensor data does not match the biometric profile, method 500 may block the input(s) to prevent unauthorized access or actions, thereby ensuring that only inputs from authorized users are accepted and processed by the IHS. At 507, method 500 may notify IHS 100 of the blocked input(s), for example, to trigger additional security measures or alerts to inform an administrator or the user of the attempted unauthorized access. Method 500 ends at 508.

Figure 6:
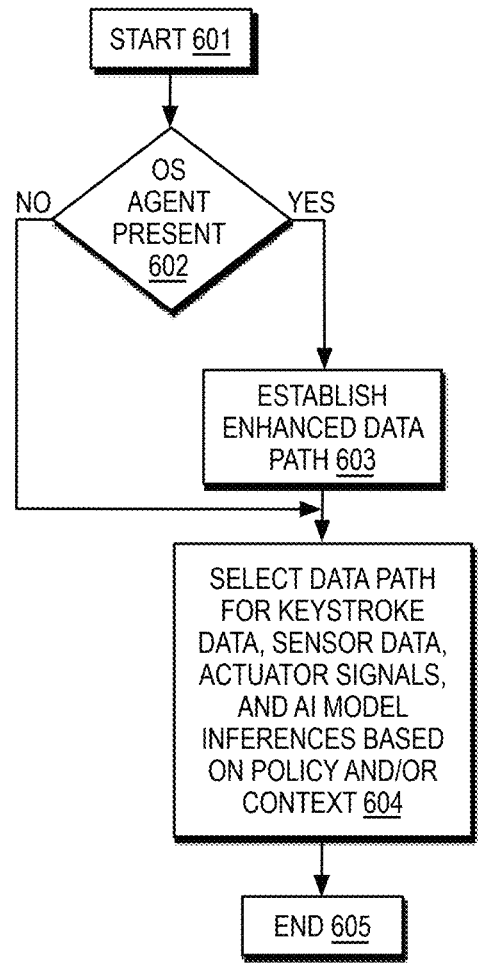
FIG. 6 is a diagram illustrating an example of a method for selecting a data path between an HID and an IHS, according to some embodiments.

FIG. 6 is a diagram illustrating an example of method 600 for selecting a data path between HID 301 and IHS 100. In some embodiments, method 600 may be implemented by at least one of: HID agent 303, OS agent 316, EC 109, and EDP 313 within HID architecture 300.

Particularly, method 600 starts at 601. At 602, method 600 may determine whether OS agent 316 is present. If so, at 603, method 600 may establish EDP 313. At 604, method 600 may select a data path for keystroke data, sensor data, actuator signals, and AI model interfaces based on policy and/or context. Policies may include predefined rules or configurations that prescribe how data should be transmitted between HID 301 and IHS 100. These policies may be based on various factors such as security requirements, data sensitivity, and performance needs. For example, a policy might specify that all keystroke data be transmitted over a secure, encrypted channel to ensure data privacy. Another policy might dictate that sensor data should be transmitted using a high-speed interface to minimize latency.

In some cases, method 600 may perform context-aware selection of data paths based on the current context or environment. This may include factors such as the type of application being used, the user's activity, workload, power consumption or availability, IHS location, IHS posture, etc. For example, if the user is engaged in a high-performance gaming application, method 600 may prioritize low-latency data paths for keystroke and sensor data to ensure a responsive gaming experience. Conversely, if the user is working on a document, method 600 may prioritize secure data paths for keystroke data to protect sensitive information.

The selection of the data path can also be based on the type of data being transmitted. Different types of data may have different requirements for transmission. For example, keystroke data might require a low-latency path to ensure real-time responsiveness, while sensor data might require a high-bandwidth path to accommodate large volumes of data. Actuator signals, which provide haptic feedback, might require a reliable and low-latency path to ensure timely feedback to the user. Accordingly, in various implementations, these types of signals may be transmitted between HID 301 and EC 109.

However, AI model interfaces might require specific data paths based on the complexity and size of the models being used. For instance, if the AI model is large and requires significant processing power, method 600 may offload the processing to cloud services and use a high-bandwidth path for data transmission. Alternatively, for smaller, locally executed AI models, method 600 may use either EC 109 and/or EDP 313 for communications with IHS 100.

In some cases, user preferences may also influence the selection of the data path at 604. Users may have specific requirements or preferences for how their data is transmitted. For example, a user may prefer to prioritize security over performance, leading to the selection of encrypted data paths for all transmissions. Alternatively, the user might prioritize performance for specific applications, leading to the selection of low-latency paths for those applications.

Real-time communication conditions may also impact the selection of the data path. The system can monitor communications performance and dynamically adjust the data path selection based on current conditions. For example, if the primary data path (e.g., EC 109) experiences high latency or packet loss, method 600 may switch to an alternative path (e.g., EDP 313) to maintain data transmission quality.

The capabilities of HID 301 and IHS 100 may also influence the selection of a data path at 604. Different devices may support different communication protocols and interfaces. Method 600 may select the most appropriate data path based on the available capabilities of the connected devices. For example, if both the HID and the IHS support high-speed USB 3.0, method 600 may select this path for data transmission because of its higher data transfer rates.

In various embodiments, the choice of communication path may be based on predefined policies and rules derived from context information received from IHS 100. For example, input data such as keystrokes, mouse movements, and button clicks are critical for real-time user interactions. A policy may prioritize low-latency and high-reliability communication paths for this type of data to ensure a responsive user experience.

EC 109 may be used to handle the transmission of input data due to its direct connection to the IHS's processor. This path is typically low-latency and reliable, making it suitable for real-time input data. As such, a policy might specify that all keystroke and movement data should be routed through EC 109 to ensure immediate processing by the IHS. Additionally, or alternatively, EDP 313 may be used for input data, especially in scenarios where HID 301 is designed to operate independently or when IHS 100 is in a low-power state. In that case, a policy may allow for the use of EDP 313 when EC 109 is unavailable or when HID 301 needs to offload processing to the cloud for enhanced performance, for instance.

Other types of data, such as control information, AI model inferences, and sensor data, may not require the same low latency as input data but might need higher bandwidth or secure transmission paths. In some cases, EC 109 may be used to transmit control information and sensor data when immediate action is required by IHS 100. For example, if HID 301 detects a security threat based on sensor data, this information may be quickly sent to IHS 100 via EC 109 for immediate response. Accordingly, a policy may specify that critical control information and high-priority sensor data should be routed through EC 109.

EDP 313 may be used for transmitting AI model inferences and other non-critical data. This path may provide higher bandwidth and support more complex data types, making it suitable for transmitting detailed sensor data and AI model outputs. A policy might specify that AI model inferences and bulk sensor data should be routed through EDP 313, for example, to avoid overloading EC 109.

The policies governing the selection of EC 109 or EDP 313 for data communication may be based on various factors, including the type of data, the current context, and the state of IHS 100. For example, policy rules may include data type-based rules which prescribe that: (a) keystroke and movement data should be routed through EC 109 for low-latency processing; and (b) AI model inferences and bulk sensor data should be routed through EDP 313 for higher bandwidth and cloud processing.

Additionally, or alternatively, context-based rules may include: (a) if IHS 100 is in a low-power state, all data should be routed through EDP 313 to ensure continuous operation of HID 301; and (b) if the user is engaged in a high-performance application, such as gaming, all input data should be routed through EC 109 to ensure real-time responsiveness.

Additionally, or alternatively, priority-based rules may include: (a) critical control information and high-priority sensor data should be routed through EC 109 for immediate action by IHS 100, and (b) non-critical data, such as periodic sensor updates, can be routed through EDP 313 to balance the load on EC 109.

In summary, the HID 301 may use either EC 109 or EDP 313 (or both) to communicate different types of data based on predefined policies and context information received from IHS 100. Input data such as keystrokes and movements can be prioritized for low-latency paths through EC 109, while other data such as AI model inferences and sensor data can be routed through EDP 313 for higher bandwidth and cloud processing. These policies may be based on data type, context, and/or priority to ensure efficient and responsive communication between HID 301 and IHS 100. Method 600 ends at 605.

In various embodiments, by incorporating a processor and memory within an HID, the HID may be configured to perform local processing of sensor data to determine if the input matches a biometric profile. This allows the HID to make real-time decisions about whether to transmit the input to an IHS, enhancing security by ensuring that only authorized users' inputs are processed. This local processing capability may reduce the need for constant communication with the IHS, thereby improving response times and reducing latency.

The arrangement of the processor and memory within the HID also enables the device to operate independently of the IHS for certain tasks, such as biometric authentication. This independence allows the HID to operate even when the IHS is in a low-power state or otherwise unavailable, providing continuous security. Additionally, this setup allows for more efficient use of the IHS's resources, as the HID may offload some of the processing tasks.

Compared to situations where biometric authentication is typically handled at the OS or application level, systems and methods described herein provide techniques for integrating these capabilities directly into the HID. This integration allows for more granular and immediate control over input events, enhancing the overall security and user experience.

For example, a keyboard implementing systems and methods described herein may be configured to prevent unauthorized access by blocking keystrokes that do not match the stored biometric profile, thereby reducing the risk of unauthorized data entry. In many applications, this may be used in various HIDs such as keyboards, mice, trackpads, game controllers, or styluses. For instance, in a gaming scenario, the HID can ensure that only the registered user's inputs are recognized, preventing unauthorized users from gaining control. In a professional setting, an HID may enhance security by ensuring that sensitive data is only accessible to authorized personnel, thereby protecting against unauthorized access and data breaches.

By comparing a user's behavior against a plurality of biometric profiles, the HID may dynamically adapt its operation based on the identified user. This allows for personalized user experiences and enhanced security measures. For example, if the HID recognizes a specific user based on their unique interaction patterns, it may enable or disable certain features tailored to that user, such as specific shortcuts or access to sensitive information. In some cases, the HID's authentication may serve as a primary or secondary factor in multi-factor authentication processes.

The HID's ability to change its operation in response to the comparison result ensures that only authorized users can perform selected operations, thereby preventing unauthorized access and enhancing overall system security. This is particularly useful in environments where multiple users share the same HID, such as in a corporate setting or a shared household.

In some cases, receiving an indication of various user interaction metrics such as keystroke frequency, keystroke velocity, pressure, button click frequency, button click velocity, mouse pressure, button pressure, and/or aftertouch from the HID, the OS agent may make more informed decisions about how to control the HID. In other cases, these interaction metrics may be processed locally by the HID's processor, without reliance on the IHS.

As such, these systems and methods may enable HID to be dynamically adjusted based on real-time user behavior and context. Controlling an aspect of the HID based on commands received from an OS application via the OS agent enables a seamless integration between the HID and the IHS.

Such integration may allow for context-aware adjustments, where the HID may change its behavior based on the current application being used. For example, the HID may provide different haptic feedback or lighting effects depending on whether the user is gaming, typing a document, or browsing the web. The ability to control aspects of the HID such as haptic feedback or lighting effects based on real-time data and commands from the OS application enhances the overall user experience by providing immediate and contextually relevant feedback.

In many cases, these operations may be independent of the IHS's EC, so that the HID may operate independently and more efficiently. This reduces latency and allows for faster response times, which may be important for applications requiring real-time feedback and adjustments. By bypassing the EC, these systems and methods may also reduce the processing load on the IHS, freeing up resources for other tasks. For example, in a gaming scenario, the HID may autonomously provide immediate haptic feedback based on the user's actions, enhancing the immersive experience. In a professional setting, the HID may autonomously adjust its lighting to highlight specific keys or provide visual cues based on the application in use, thereby improving productivity and reducing errors.

Figure 7:
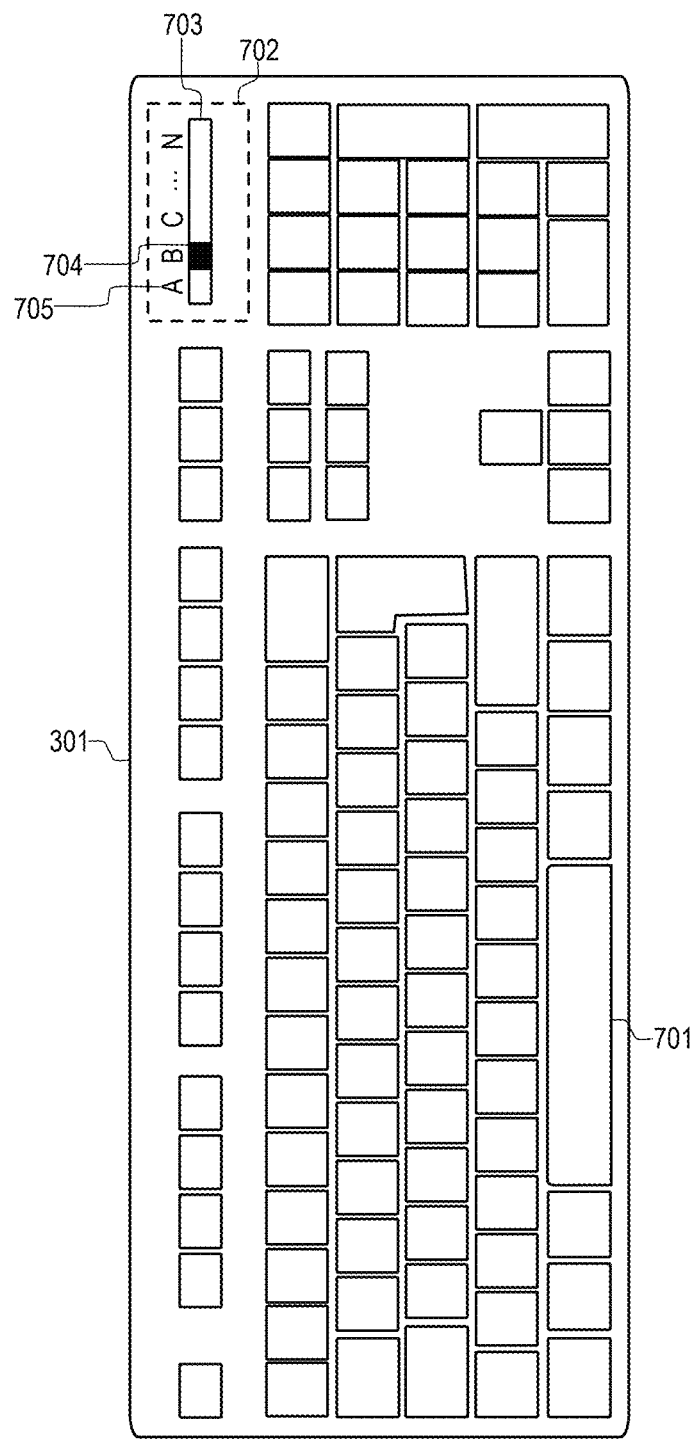
FIG. 7 is a diagram illustrating an example of a system for handling Artificial Intelligence (AI) models for HIDs, according to some embodiments.

FIG. 7 is a diagram illustrating an example of system 700 for handling AI models for HIDs. In this case, HID 301 comprises keys 701, AI model selector portion or element 702, AI model selector 703, sliding switch 704, and AI model label or indicator 705. For example, HID 301 may be a keyboard.

Particularly, HID 301 may include input mechanisms 701, which may be used for inputting data and/or commands. Input mechanisms 701 may also include sensors 308 configured to detect various user interactions, such as keystrokes, pressure, velocity, after touch, etc.

AI model selector portion 702 may include a dedicated area in the HID 301 chassis that houses AI model selector 703, which comprises sliding switch 704 configure to slide below any of AI model labels 705 (e.g., "A," "B," "C," . . . "N") for selection by the user. In some embodiments, AI model selector portion 702 may enable users to select different AI models for processing user inputs. In other embodiments, AI model selector 703 may be implemented using different devices, such as buttons, dials, or switches, to facilitate AI model selection.

Sliding switch 704 may be used to toggle between different AI models—it provides a physical interface for users to select a desired AI model by moving the switch to different positions. AI model label 705 includes a static or dynamic indicator (e.g., electronic) that displays the currently selected AI model 306. In some implementations, AI model label 705 may help the user identify which AI model is active, ensuring that the correct model is used for processing user inputs.

Figure 8:
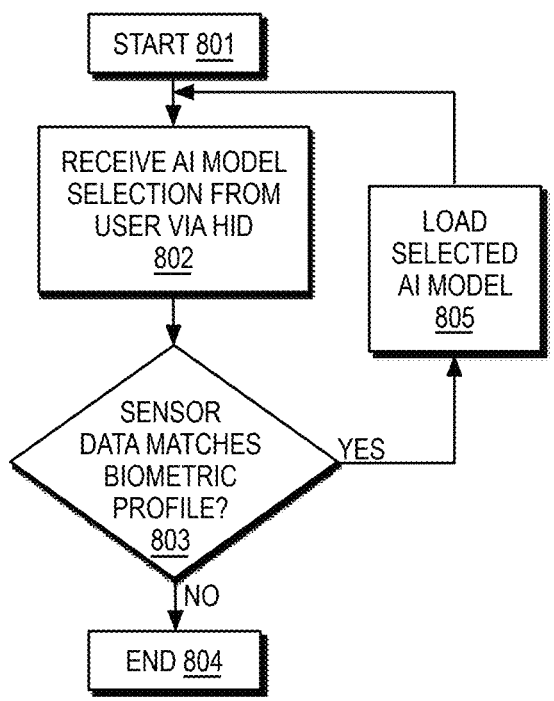
FIGS. 8 and 9 are diagram illustrating examples of methods for handling AI models for HIDs, according to some embodiments.
Figure 9:
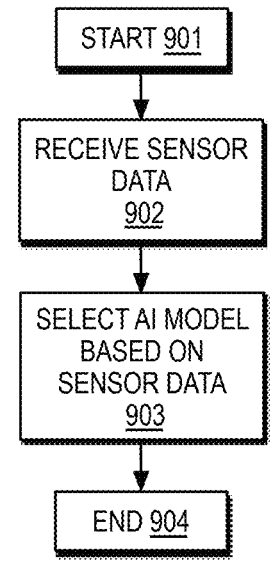

FIGS. 8 and 9 are diagram illustrating examples of methods 800 and 900 for handling AI models for HIDs. In some embodiments, method 800 may be implemented, at least in part, by HID 301.

Method 800 starts at 801. At 802, method 800 may include receiving an AI model selection from the user via HID 301. For instance, the user may select the AI model through AI model selector 703, such as a knob, switch, button, slider, lever, dial, scroll wheel, or keypad.

At 803, method 800 may determine whether sensor data 402 or processed sensor data (e.g., the output of AI model inferences, etc.) matches a biometric profile. For example, sensor data 402 may include metrics such as keystroke frequency, velocity, pressure, and aftertouch, which may be captured by sensors 308 integrated into HID 301. At 804, if sensor data 402 does not match any of the biometric profiles (or if it matches a biometric profile of an unauthorized user), method 800 ends.

At 805, if sensor data 402 matches the biometric profile (or if it doesn't match any profile of any unauthorized user), method 800 may load a selected one of AI model 306. The AI model may be configured to receive raw user input and produce processed user input, for example, for transmission to IHS 100, thus enhancing the operation and/or responsiveness of HID 301.

FIG. 9 shows an example of method 900 for handling AI model selection based on sensor data 402 in HID 301. In some embodiments, method 900 may be implemented, at least in part, by HID 301.

Particularly, method 900 starts at 901. At 902, method 900 may include receiving sensor data from HID 301. The sensor data may include metrics such as keystroke frequency, velocity, pressure, and aftertouch, which are captured by sensors integrated into HID 301.

At 903, method 900 may autonomously select one or more of AI models 306 based on received sensor data 402 including various metrics such as, for example, as aftertouch, velocity, pressure, and keystroke frequency. The selected AI model may be configured to receive raw user input 401 and produce processed user input, for example, for transmission to IHS 100. Method 900 ends at 904.

For example, in a user mood inference scenario, sensor data 402 may include metrics such as keystroke velocity and pressure. If sensors 308 detect rapid and forceful keystrokes, this may indicate that the user is frustrated or stressed. Based on this, HID 301 may select a mood inference AI model that triggers appropriate actions, such as suggesting a break or preventing the sending of an emotionally charged email. The selected AI model may also adjust the HID's feedback to provide a calming effect, such as reducing haptic feedback intensity.

In the case of gaming, sensor data 402 may include metrics such as aftertouch and keystroke frequency. For example, if sensors 308 detect varying levels of aftertouch pressure during gameplay, this may indicate the user's intent to control the intensity of an action, such as the speed of a character's movement or the force of a weapon's strike. Based on this data, HID 301 may select a gaming-specific AI model that adapts the controls accordingly, providing a more immersive and responsive gaming experience. The selected AI model may also automate repetitive actions based on the detected keystroke frequency.

In a biometric authentication scenario, sensor data 402 may include metrics such as keystroke frequency, velocity, and pressure. For example, if the sensors detect a unique pattern of keystroke dynamics that matches a stored biometric profile, this may be used to authenticate the user, whether on its own or as part of a multi-factor authentication process. Based on this data, HID 301 may select a biometric authentication AI model that verifies the user's identity and grants access to IHS 100. If sensor data 402 does not match any stored profiles, the selected AI model may trigger additional security measures or restrict access.

In the case of a context-aware input scenario, sensor data 402 may include metrics such as button click frequency and mouse pressure. For example, if sensors 308 detect a high frequency of button clicks and varying mouse pressure, this may indicate that the user is performing a task that requires precise control, such as graphic design or video editing. Based on this data, HID 301 may select a context-aware AI model that adjusts the input settings to optimize the user's experience. The selected AI model may enable features such as customizable shortcuts, enhanced precision for mouse movements, and context-specific feedback to improve productivity and accuracy.

Figure 10:
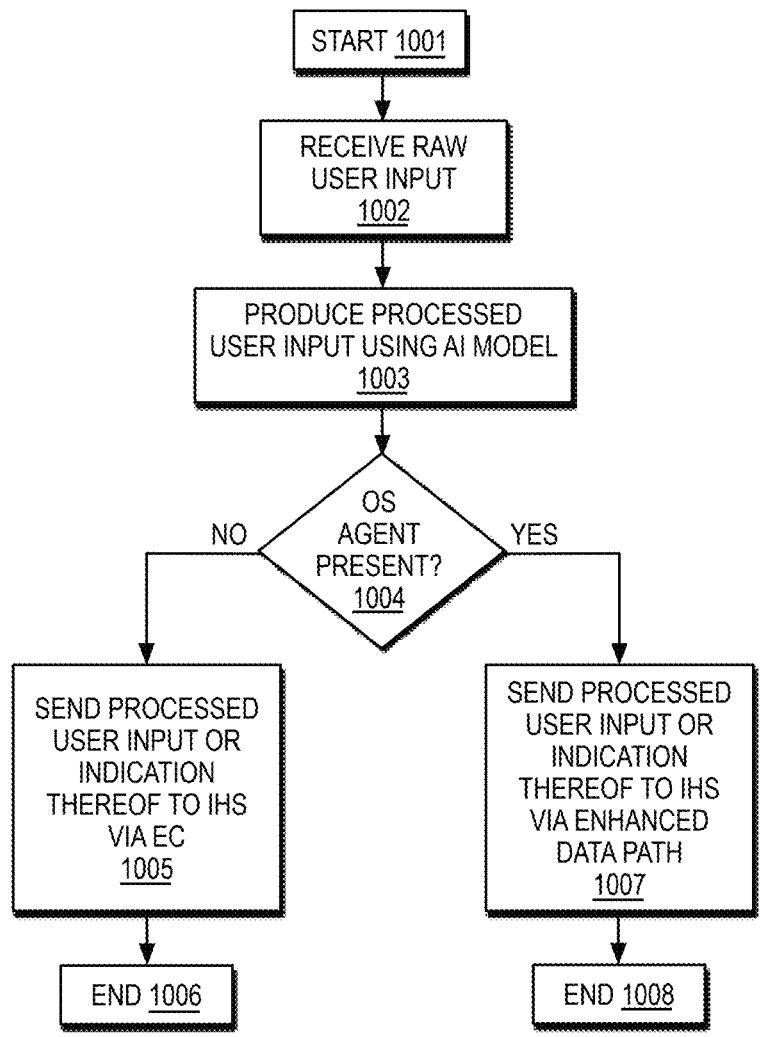
FIG. 10 is a diagram illustrating an example of a method for communicating AI model inferences or processed user inputs to an IHS, according to some embodiments.

FIG. 10 is a diagram illustrating an example of method 1000 for communicating AI model inferences or processed user inputs to IHS 100. In some embodiments, method 1000 may be implemented, at least in part, by HID 301.

Method 1000 starts at 1001. At 1002, method 1000 may include receiving raw user input. At 1003, method 1000 may produce processed user input using a selected AI model. At 1004, method 1000 determines whether OS agent 316 is present in IHS 100.

At 1005, if OS agent 316 is not present, method 1000 may send processed user input or an indication thereof to the IHS via EC 109. This ensures that the processed user input is communicated to IHS 100 even in the absence of the OS agent 316, and at 1006, method 1000 ends.

At 1007, if OS agent 316 is present, method 1000 may send processed user input or an indication thereof to IHS 100 via EDP 313. This feature may allow for efficient and reliable data transmission between the HID and the IHS. At 1008, method 1000 ends.

Figure 11:
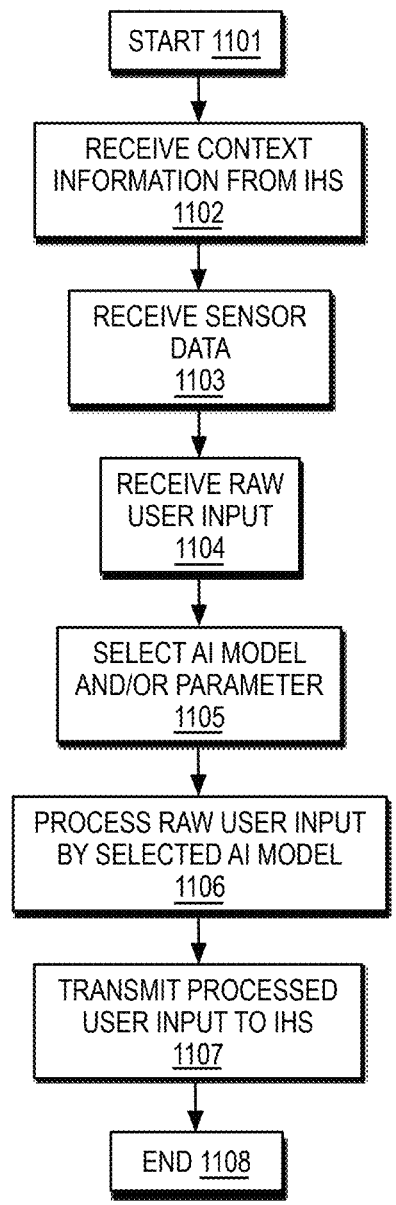
FIG. 11 is a diagram illustrating an example of a method for processing user input by an HID using an AI model, according to some embodiments.

FIG. 11 shows an example of method 1100 for processing user input in a Human Interface Device (HID) using an Artificial Intelligence (AI) model. In some embodiments, method 1000 may be implemented, at least in part, by HID 301. Using method 1100, context information may be employed to select an appropriate AI model for HID 301 based on the current state or environment of the IHS 100.

At 1102, method 1100 may include receiving context information from IHS 100 via EC 109 and/or OS agent 316 through EDP 313. The context information may include data about the current state or environment of the IHS, such as the type of application being used, user activity, workload, power consumption, network status, IHS location, IHS posture, administrative policies, or other relevant factors.

At 1103, method 1100 may include receiving an AI model selection. Again, the AI model selection may be made by the user through various input mechanisms such as a knob, switch, button, slider, lever, dial, scroll wheel, or keypad. At 1104, method 1100 may include receiving raw user input. The raw user input may also include keystrokes, mouse movements, button presses, or other interactions with the HID.

At 1105, method 1100 may include processing the raw user input by the selected AI model based on context information. The selected AI model may be configured to receive raw user input and produce processed user input, in some cases, considering the context information received from IHS 100. At 1106, method 1100 may transmit the processed user input to IHS 100. Method 1100 ends at 1107.

In a gaming scenario, for example, context information may include the type of game being played, the user's activity level, and the current IHS performance. For example, if the user is playing a fast-paced first-person shooter game, the context information may indicate high activity levels and the need for low-latency input processing.

Based on this information, HID 301 may select a gaming-specific AI model that prioritizes rapid keystroke and mouse movement detection, adjust the sensitivity of the input devices, and/or provide real-time haptic feedback to enhance the gaming experience. The selected AI model may also automate repetitive actions, such as reloading or switching weapons, to improve the user's performance.

In a professional setting, context information may include the type of application being used, the user's workload, and a current task. For example, if the user is working on a document in a word processing application, context information may indicate the need for accurate text input and error correction.

Based on this information, HID 301 may select a writing-specific AI model that provides auto-correct and text prediction features, suggests grammar improvements, and/or adjust the keyboard layout to include shortcuts for common editing functions. The selected AI model may also provide context-aware adjustments, such as enabling a numeric keypad when working on a spreadsheet or highlighting specific keys for quick access to frequently used functions.

In a multilingual communication scenario, context information may include the user's language preferences, a recipient's language, and a type of communication being conducted. For example, if the user is composing an email in English but needs to send it to a recipient who speaks French, context information may indicate the need for language translation and localization.

Based on this information, HID 301 may select a language-specific AI model that translates the text input from English to French in real-time, adjust the keyboard layout to include French diacritical marks, and/or provide suggestions for culturally appropriate phrases. The selected AI model may also adapt the input devices to support multiple languages, allowing the user to switch between languages seamlessly.

In the case of online shopping, the information may include the type of products being viewed, the user's browsing history, and current promotions or discounts available. For example, if the user is browsing for electronics, context information may indicate the need for detailed product specifications and reviews. Based on this information, HID 301 may select a shopping-specific AI model that provides personalized product recommendations, highlights current deals, and/or offers real-time price comparisons. The selected AI model may also facilitate quick navigation through product categories and streamline the checkout process, enhancing the overall shopping experience.

Traditional HIDs such as keyboards, mice, and game controllers do not have the capability to understand or respond to the emotional state of the user. This lack of emotional awareness can lead to suboptimal user experiences, particularly in high-stress or emotionally charged situations.

For example, when a user experiences heightened emotions, it may negatively impact their ability to compose an effective and professional email. The emotional state of the user could lead to the inclusion of inappropriate content, tone, or language in the email, which may not be well-received by the recipient. This could potentially harm the user's personal or professional relationships.

Additionally, current gaming experiences lack dynamic adaptability based on the user's mood. Games typically do not adjust their difficulty level, storyline, or gameplay elements in response to the user's emotional state. As a result, users may not find a game engaging or enjoyable when their mood doesn't align with the game's static environment. This lack of personalization and adaptability may potentially lead to a decrease in user satisfaction and engagement with the game.

To address these, and other concerns, systems and methods described herein may integrate an Emotional AI (EAI) model into HID agent 303 and/or OS agent 316 to provide advanced emotional awareness and adaptive responses. Such EAI model may employe multimodal emotion recognition, which improves the accuracy of emotion detection by combining the analysis of human expressions from various forms such as texts, physiology, facial expressions, body movement and gestures, and/or speech.

In some cases, by analyzing the user's typing behavior, including speed, rhythm, pressure, and/or errors, HID agent 303 may gain insights into their emotional state. Computer vision techniques may used to analyze facial expressions and eye movements, while changes in pupil size may indicate emotional arousal. Speech analysis may reveal emotional cues such as stress or happiness, and wearable devices may monitor the user's heart rate, which changes with different emotions.

Based on the detected emotional state, the EAI model may take mood-based actions to enhance the user experience. For example, if the detected emotion is negative, such as anger or frustration, HID agent 303 and/or OS agent 316 may temporarily disable keyboard typing to prevent the user from sending messages they might regret later.

In a gaming scenario, for instance, the EAI model may dynamically adjust game difficulty and modify gameplay elements to provide a more immersive experience. For instance, if the player is detected to be stressed or scared, for example, using HID sensor data and/or other biometric or context data (e.g., heard rate, in-game behaviors, etc.), the game may reduce the difficulty level or introduce calming elements to help the player relax. Conversely, if the player is detected to be bored or disengaged, the game may increase the difficulty level or introduce new challenges to re-engage the player. If the player is detected to be excited or engaged, the game may maintain the current difficulty level and continue to provide challenges at a pace that matches the player's engagement. Additionally, in a mental health monitoring scenario, HID agent 303 and/or OS agent 316 may alert the user to take a rest if signs of emotional distress are detected. By leveraging emotional awareness, the EAI model may provide a more responsive and adaptive interface that can improve performance, reduce stress, and prevent negative consequences.

Figure 12:
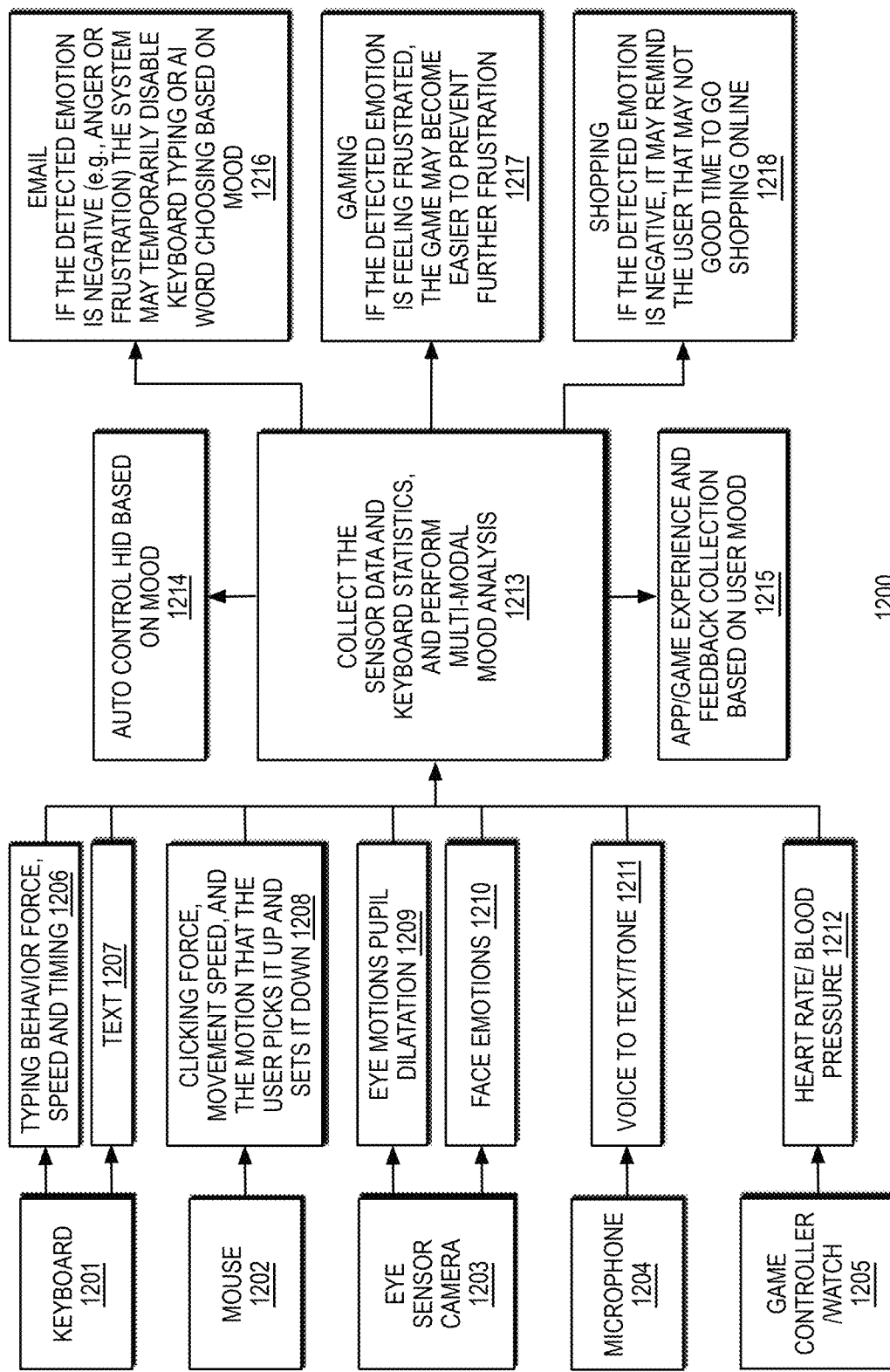
FIG. 12 is a diagram illustrating an example of a method for processing user input by an HID using an emotional AI (EAI) model, according to some embodiments.

In that regard, FIG. 12 is a diagram illustrating an example of method 1200 for processing user input by an HID using an emotional AI (EAI) or mood detection model. In some embodiments, method 1200 may be implemented, at least in part, by HID agent 303 and/or OS agent 316. In operation, method 1200 may include collecting sensor data and/or context information, analyzing the data to determine the user's mood, and/or adjusting the HID's and/or IHS's operation based on the identified mood.

Particularly, in method 1200, keyboard 1201 may provide typing behavior, force, speed, and/or timing information 1206 and/or keystroke or text information 1207. Mouse 1202 may provide clicking, force, movement, speed, and/or motion information (e.g., when the user picks it up and sets it down) 1208. Eye sensor camera 1203 may provide eye motion and pupil dilatation information 1209 and recognized face emotions 1210. Microphone 1204 may provide voice to text and/or tone information 1211. Game controller and/or watch 1205 may provide heart rate and/or blood pressure information 1212.

At 1213, HID agent 303 and/or OS agent 316 may collect the sensor data and keyboard statistics and perform multimodal analysis on one or more of items 1207-1212 to infer a user's mood.

At 1214, method 1200 may control aspects of HID 301 based on the user's mood. Method 1200 may adjust the HID's settings and operations based on the identified mood. For example, if the user is detected to be stressed, HID 301 may reduce the intensity of haptic feedback or adjust the lighting to create a calming effect.

At 1215, method 1200 may adjust the application and/or game experience and based on the user's mood. Method 1200 may use the collected sensor data to determine the user's emotional state and adjust the application and/or game experience accordingly. For example, if the user is detected to be frustrated, the game difficulty may be reduced to prevent further frustration.

At 1216, if the detected emotion is negative (e.g., anger, frustration, or stress), HID agent 303 and/or OS agent 316 may temporarily disable the keyboard or change the word choice based on mood. Additionally, or alternatively, method 1200 may not allow a user to send an email. This may involve using the collected sensor data to determine if the user is experiencing negative emotions and taking appropriate actions to prevent the user from sending emotionally charged emails.

At 1217, method 1200 may adjust a gaming experience if the detected emotion is anger, frustration, or stress, to prevent further frustration. This may involve using the collected sensor data to determine if the user is experiencing negative emotions and adjusting the game experience.

At 1218, method 1200 may modify the shopping experience if the detected emotion is anger, frustration, or stress, to limit the amount of shopping done online. This may involve using the collected sensor data to determine if the user is experiencing negative emotions and taking appropriate actions to prevent the user from making impulsive purchases (e.g., by blocking access to credit cards, etc.).

In various embodiments, the Emotional AI (EAI) model integrated into HID 301 may be applied in various use cases to enhance user experience by adapting to the user's emotional state. For example, in customer service training programs, an EAI model as described herein may be used to simulate interactions with emotionally charged customers. By analyzing the trainee's emotional state through keystroke dynamics, facial expressions, and voice tone, these systems and methods may provide real-time feedback and suggestions for improving their responses to help trainees develop better emotional intelligence and customer handling skills.

In virtual reality (VR) therapy sessions, an EAI model as described herein may monitor the user's emotional state to tailor the therapeutic experience. For example, if the user is detected to be anxious or stressed by HID 301, the VR environment may be adjusted to include calming elements such as soothing visuals and sounds. Conversely, if the user is detected to be disengaged by HID 301, the VR environment may introduce more stimulating elements to re-engage the user.

In online learning platforms, an EAI model as described herein may be used to monitor students' emotional states and adapt the learning content accordingly. For instance, if a student is detected to be frustrated or confused by HID 301, these systems and methods may provide additional explanations or simpler exercises. If a student is detected to be bored by HID 301, the system may introduce more challenging tasks to keep them engaged.

In remote work settings, an EAI model as described herein may be used to monitor employees' emotional states to optimize their work environment. For example, if an employee is detected to be stressed by HID 301, these systems and methods may suggest taking a break or adjusting the lighting and temperature to create a more comfortable workspace. If an employee is detected to be highly focused by HID 301, the system can minimize distractions by muting notifications and alerts.

In some cases, an EAI model as described herein may be used to transform traditionally intense and competitive games into relaxing experiences. For example, if a player is detected to be stressed or anxious by HID 301, these systems and methods may modify a first-person shooter (FPS) game to include calming elements such as soothing background music, slower-paced gameplay, and non-violent objectives. This may allow players to enjoy their favorite games in a more relaxed and stress-free manner.

In another case, an EAI model as described herein may be used to create stress-inducing training simulations for professions that require high-stress tolerance, such as emergency responders or military personnel. By detecting when the user is too calm or disengaged by HID 301, these systems and methods may introduce stressors such as time constraints, challenging tasks, and simulated emergencies to train users to perform effectively under pressure.

In yet another case, an EAI model as described herein may be used to help users regulate their emotions while interacting online in social media platforms. For example, if a user is detected to be angry or upset by HID 301 while composing a post or comment, these systems and methods may suggest taking a moment to reflect before posting or provide calming prompts. This may help reduce the incidence of online conflicts and promote healthier online interactions.

In some cases, while it might seem logical to minimize distractions when a user is relaxed, in some cases the EAI model may increase system notifications to gently re-engage the user. For instance, if the user is detected to be in a relaxed state, the system may increase the frequency of notifications for upcoming tasks or reminders. This may help the user transition smoothly from a relaxed state to a more focused and productive state, ensuring that important tasks are not overlooked.

In scenarios where the user is engaged in low-intensity tasks, the EAI model may enhance visual and auditory stimuli to maintain engagement and prevent boredom. For example, if the user is detected to be disengaged or bored, the EAI model can increase the brightness and color saturation of the display, as well as adjust the audio equalization to make system sounds more vibrant. This approach may help keep the user alert and engaged, even during ordinary tasks.

In high-intensity gaming scenarios, the EAI model may detect that the user is becoming overly stressed or frustrated, and it may temporarily lower the game's frame rate or reduce graphical settings. This may help create a more manageable and less overwhelming gaming experience, allowing the user to regain composure and enjoy the game without excessive stress. Once the user's emotional state stabilizes, the EAI model may gradually restore the original performance settings.

In summary, by incorporating a processor and memory within HID 301, systems and methods described herein may locally process sensor data in real-time to identify a user's mood and adjust its operation accordingly. This may enable immediate decisions, enhancing user experience by providing contextually relevant feedback and actions. Unlike conventional HIDs that rely on basic inputs, these systems and methods may capture a wide range of user interactions-such as keystroke frequency, pressure, and aftertouch—and uses AI-driven functionalities to infer emotional states, extending the benefits of AI to the hardware level.

This integration allows HID 301 to operate independently of IHS 100 for tasks like mood identification, ensuring continuous and adaptive interaction even when IHS 100 is in a low-power state. Systems and methods described herein may analyze input data to adjust its behavior dynamically, improving user satisfaction by creating a more personalized experience. For example, in gaming or professional settings, these systems and methods may reduce haptic feedback or adjust lighting to create a calming effect if stress is detected.

Additionally, systems and methods described herein may enhance security by blocking inputs that do not match stored biometric profiles. They may also adapt the complexity of tasks based on the user's emotional state-reducing difficulty when the user is stressed and increasing it when they are bored or disengaged. By processing this data at the hardware level, these systems and methods provide faster, more efficient responses, improving overall performance and user engagement.

In various implementations, HID 301 may operate autonomously without requiring interaction with any OS agent or EC. This autonomous functionality allows the HID to perform various mood-related tasks independently, such as adjusting input sensitivity, modifying lighting effects, and providing haptic feedback based on the user's emotional state. By incorporating a processor and memory within HID 301, the device can process raw user input and sensor data to produce optimized responses based on pre-loaded AI models tailored for mood detection and response. These AI models may include algorithms for analyzing keystroke dynamics, mouse activity, facial expressions, voice tone, and heart rate to determine the user's mood.

For instance, during a gaming session, HID 301 may autonomously adjust the sensitivity of the mouse or keyboard based on the user's detected stress levels, ensuring consistent and responsive controls. Similarly, HID 301 may modify the intensity and color of lighting effects to create a calming or stimulating environment based on the user's emotional state. Haptic feedback can also be adjusted to provide a more immersive and emotionally supportive experience. These adjustments can be made without any guidance from IHS 100, allowing the HID to dynamically adapt to the user's needs in real-time.

When operating independently, HID 301 may reduce the processing load on IHS 100 and minimize latency, thus providing a more responsive user experience. This independence also ensures that HID 301 operates effectively even when IHS 100 is in a low-power state or otherwise unavailable. The autonomous operation capability of HID 301 is particularly beneficial in scenarios where immediate feedback and real-time processing are necessary, such as in gaming, virtual reality, and professional environments. By dynamically adapting to the user's emotional state, HID 301 enhances the overall user experience, providing a more personalized and responsive interaction without relying on external system resources.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor; and
a memory coupled to the processor, the memory having program instructions stored thereon that, upon execution, cause the processor to:
identify a mood of a user based, at least in part, upon sensor data obtained from a Human Interface Device (HID); and
modify an operation based, at least in part, upon the identification;
wherein to modify the operation, the program instructions, upon execution, cause the IHS to instruct an application, in response to the mood, to at least temporarily halt a shopping or checkout operation.

2. The IHS of claim 1, wherein the HID comprises a keyboard, a mouse, a trackpad, a game controller, or a stylus.

3. The IHS of claim 1, wherein the sensor data is indicative of at least one of: a keystroke frequency, a keystroke velocity, a pressure, a button click frequency, a button click velocity, a mouse pressure, a button pressure, or an after touch.

4. The HID of claim 1, wherein the mood comprises at least one of: focused, frustrated, stressed, excited, curious, distracted, bored, scared, or satisfied.

5. The IHS of claim 1, wherein to identify the mood, the program instructions, upon execution, cause an Artificial Intelligence (AI) model executed by the IHS to process the sensor data.

6. The IHS of claim 5, wherein the AI model is further configured to process eye tracking data, facial expression data, gesture data, movement data, heart rate data, blood pressure data, or speech data to identify the mood.

7. An Information Handling System (IHS), comprising:
a processor; and
a memory coupled to the processor, the memory having program instructions stored thereon that, upon execution, cause the processor to:
identify a mood of a user based, at least in part, upon sensor data obtained from a Human Interface Device (HID);
select an enhanced data path between the HID and IHS for the sensor data without any involvement by an Embedded Controller (EC) of the IHS, in response to an Operating System (OS) agent being present;
select an Embedded Controller (EC) data path between the HID and IHS for the sensor data, in response to the Operating System (OS) agent not being present; and
modify an operation based, at least in part, upon the identification.

8. The IHS of claim 7, wherein to modify the operation, the program instructions, upon execution, cause the IHS to change an HID light in response to the mood.

9. The IHS of claim 7, wherein to modify the operation, the program instructions, upon execution, cause the IHS to at least partially disable the HID in response to the mood.

10. The IHS of claim 7, wherein to modify the operation, the program instructions, upon execution, cause the IHS to adjust a level of difficulty of a game in response to the mood.

11. The IHS of claim 7, wherein to modify the operation, the program instructions, upon execution, cause the IHS to instruct an application, in response to the mood, to at least temporarily halt sending an email or message.

12. The IHS of claim 7, wherein to modify the operation, the program instructions, upon execution, cause the IHS to instruct an application, in response to the mood, to at least temporarily halt receiving or displaying an email or message.

13. The IHS of claim 7, wherein to modify the operation, the program instructions, upon execution, cause the IHS to instruct an application, in response to the mood, to at least temporarily halt a shopping or checkout operation.

14. The IHS of claim 7, wherein to modify the operation, the program instructions, upon execution, cause the IHS to instruct an application, in response to the mood, to at least temporarily halt an electronic signature operation.

15. The IHS of claim 1, An Information Handling System (IHS), comprising:
  a processor; and
  a memory coupled to the processor, the memory having program instructions stored thereon that, upon execution, cause the processor to:
    identify a mood of a user based, at least in part, upon sensor data obtained from a Human Interface Device (HID); and
    modify an operation based, at least in part, upon the identification;
    wherein to modify the operation, the program instructions, upon execution, cause the IHS to instruct an application, in response to the mood, to at least temporarily halt an electronic signature operation.

16. The IHS of claim 15, wherein the program instructions, upon execution, further cause the processor to;
  select an enhanced data path between the HID and IHS for the sensor data without any involvement by an Embedded Controller (EC) of the IHS, in response to an Operating System (OS) agent being present; and
  select an Embedded Controller (EC) data path between the HID and IHS for the sensor data, in response to the Operating System (OS) agent not being present.

\* \* \* \* \*